United States Patent [19]

Bean et al.

[11] Patent Number: 4,916,621

[45] Date of Patent: Apr. 10, 1990

[54] MICROCOMPUTER TRAFFIC COUNTER AND DATA COLLECTION METHOD

[76] Inventors: John E. Bean, 28701 N. Main St., Ridgefield, Wash. 98642; Thayer K. Rorabaugh, 14509 NE. 280th, Battle Ground, Wash. 98604

[21] Appl. No.: 52,615

[22] Filed: May 18, 1987

[51] Int. Cl.[4] .............................................. G06F 15/48

[52] U.S. Cl. .................................... 364/436; 364/437; 340/908; 340/934

[58] Field of Search ................................ 364/436–438, 364/550; 340/907, 908, 916, 917, 933, 934

[56] References Cited

U.S. PATENT DOCUMENTS

| | | | |
|---|---|---|---|
| 3,397,305 | 4/1968 | Auer | 235/150.24 |
| 3,397,306 | 8/1968 | Auer | 235/150.24 |
| 3,549,869 | 2/1967 | Kuhn | 235/92 |
| 3,711,686 | 1/1973 | Apitz | 235/150.24 |
| 3,878,371 | 4/1975 | Burke | 235/92 PD |
| 3,920,967 | 11/1975 | Martin et al. | 364/437 |
| 3,922,649 | 11/1975 | Thome | 340/173 R |
| 3,959,633 | 5/1976 | Lawrence et al. | 235/92 T |
| 4,023,017 | 5/1977 | Ceseri | 364/437 |
| 4,258,430 | 3/1981 | Tyburski | 364/900 |
| 4,322,801 | 3/1982 | Williamson et al. | 364/436 |
| 4,390,951 | 6/1983 | Marcy | 364/436 |

OTHER PUBLICATIONS

Dallas Semiconductor Corp., "Smart Watch", Preliminary with Diagrams for DS1216, Jan., 1985, 12 pages.

Basicon, Condensed Catalog #2, Intelligent Miniature Control Components for Industry, 6 pages; DSMS 1529 PL5M1086, Oct. 1986.

Multisonics, Inc. Nine-O-One Controller (901) Traffic Control, Sections 1-3, Section 5, pp. 1-5, 20-21, 25-27, 31, 36, 41 (Pull out diagrams omitted), 1975.

*Primary Examiner*—Parshotam S. Lall
*Assistant Examiner*—Brian M. Mattson
*Attorney, Agent, or Firm*—Marger & Johnson

[57] ABSTRACT

A portable, microprocessor-based data collection unit can be plugged directly into traffic detectors for recording event data, such as traffic volume, disconnected from the traffic detector without loss of data, and then plugged directly into a personal computer to unload the data, communicating via a serial communications cable without any additional interface device or reader. Developed with retrofitting in mind, with its own microprocessor, and battery-powered real-time clock and data storage all interconnected in one circuit, the data collection unit can use existing air switches/loop detectors and power supplies of prior traffic counters. The microprocessor, with suitable software burned into an EPROM, can operate as a microcomputer for interchangeably collecting traffic data and unloading the data to another computer via a common connector. Upon initialization, the microprocessor samples various ports in the connector to determine whether to operate in a field mode or an office mode and, in the field, to which kind of detector it is connected.

32 Claims, 41 Drawing Sheets

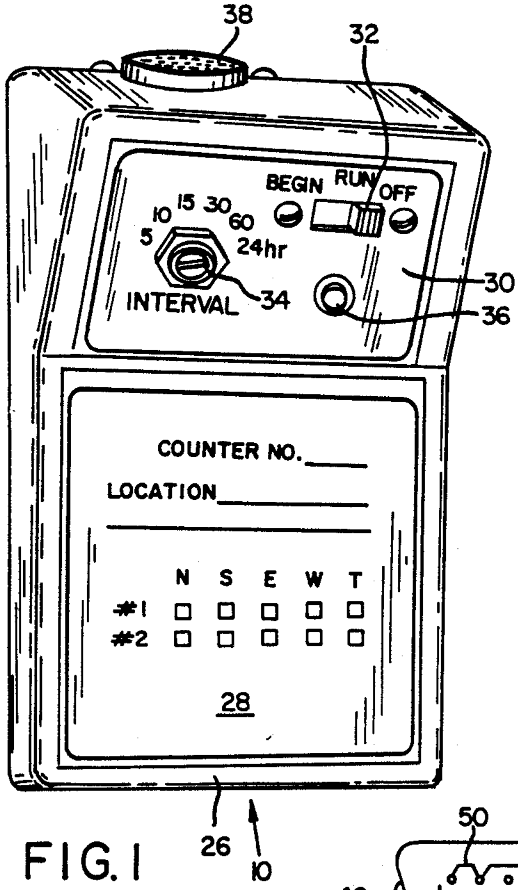
FIG. 1
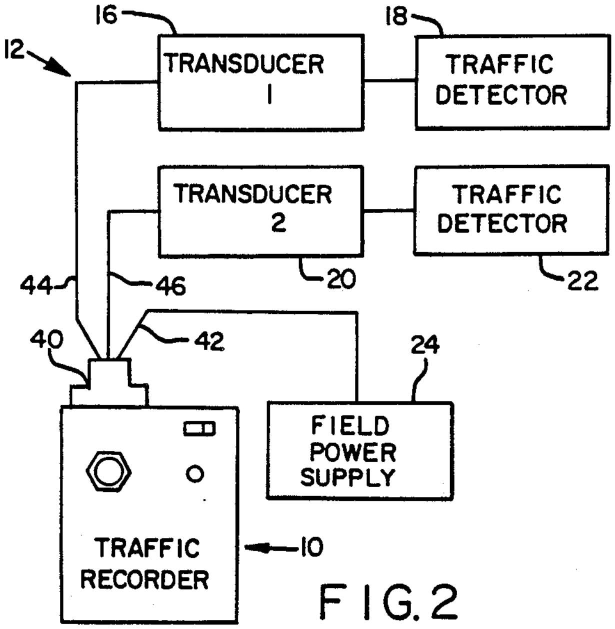
FIG. 2
FIG. 3
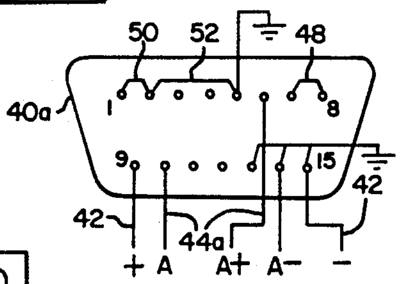
FIG. 4
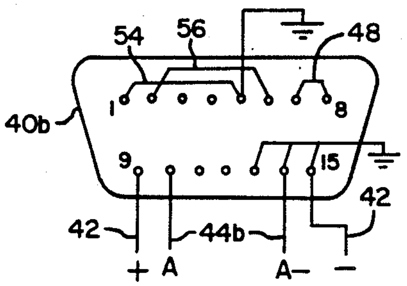
FIG. 5
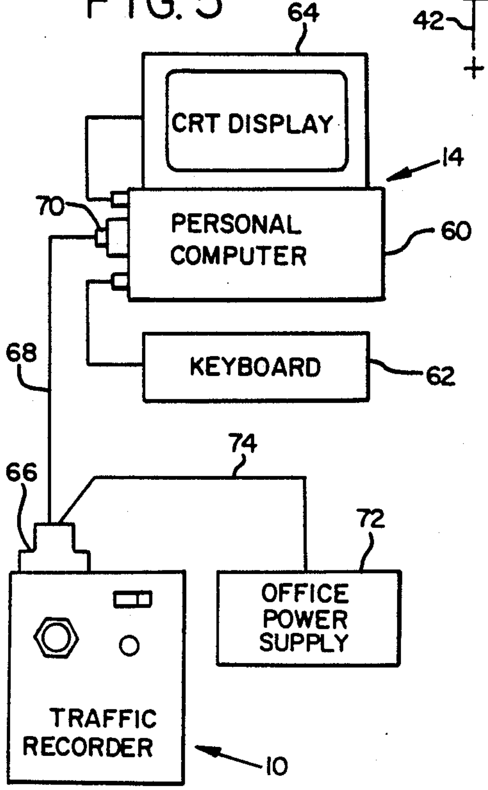
FIG. 6
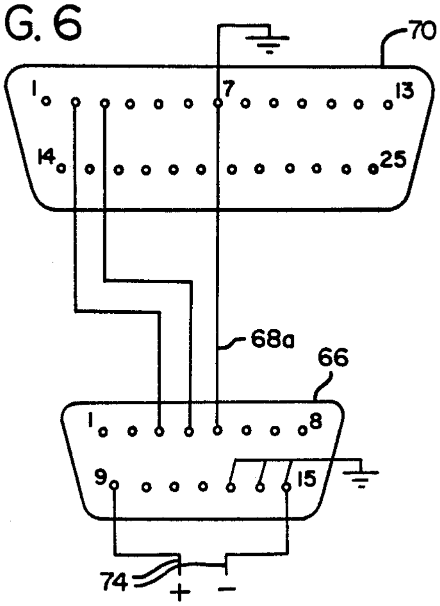

Routine CHR_IN

Routine BT_OUT

Routine SN_BCD

FIG. 9C (con't)
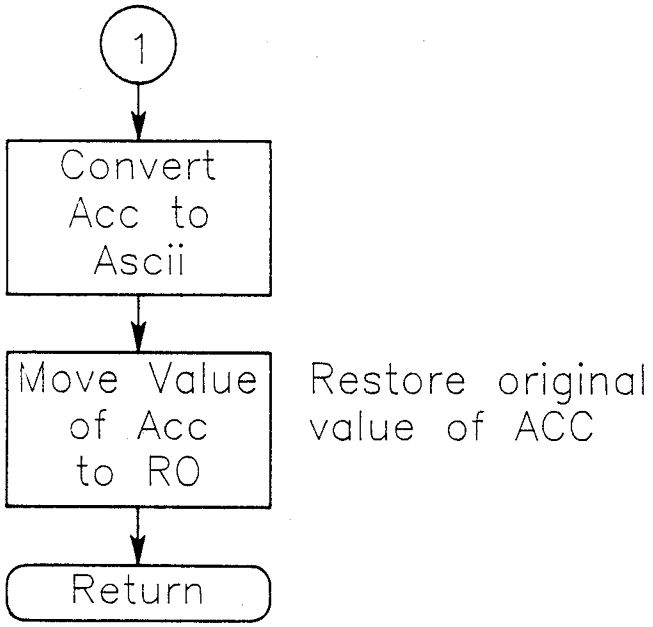

Routine CR_LF
Send Carraige Return
Line Feed to PC

Routine Send Count

FIG. 9E (con't)
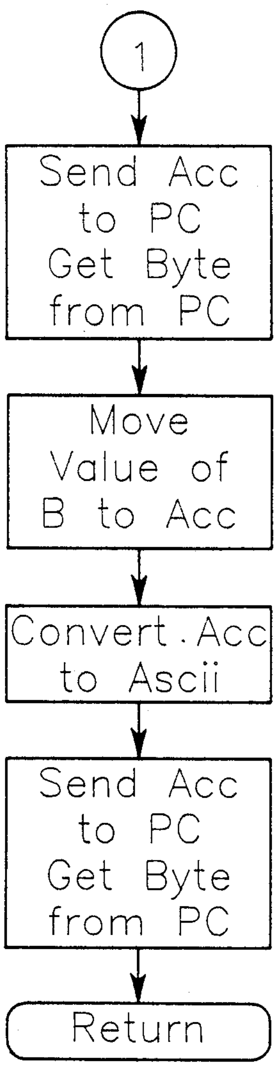

BEGIN CLOCK SECTION

This section set the MicroCounts Clock using the time sent by the PC

FIG. 9G (con't)
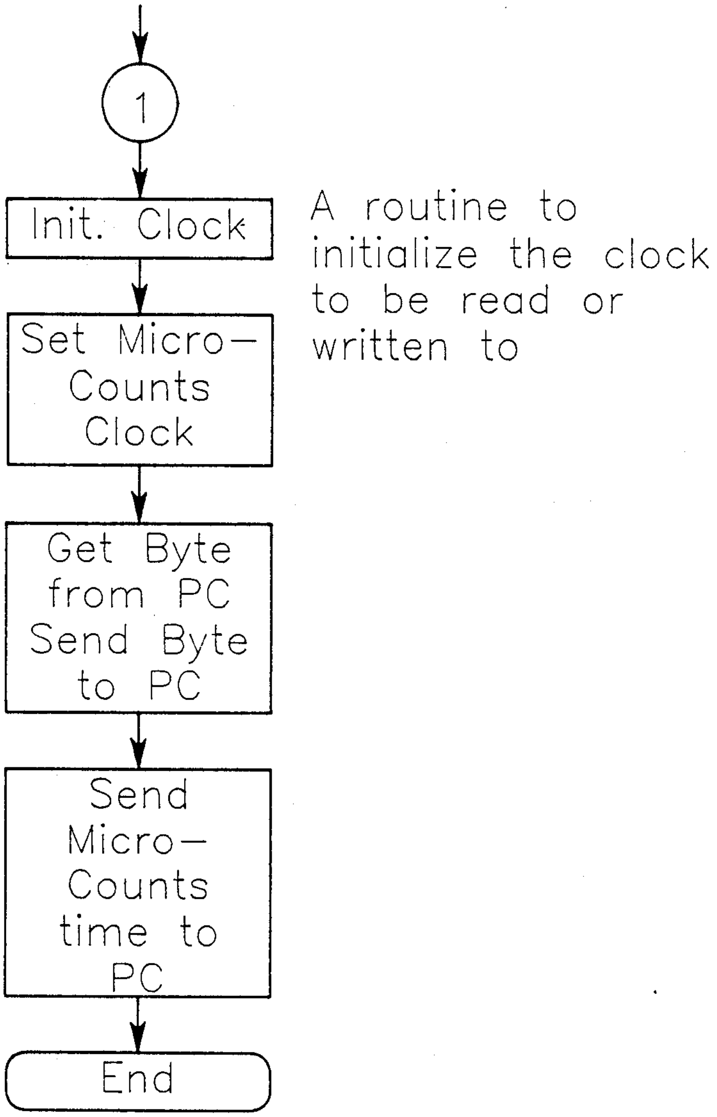
FIG. 9H
ROUTINE TO
INITIALIZE CLOCK
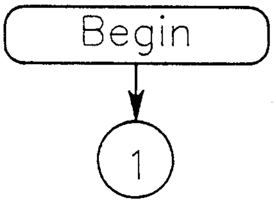

FIG. 9H (con't)
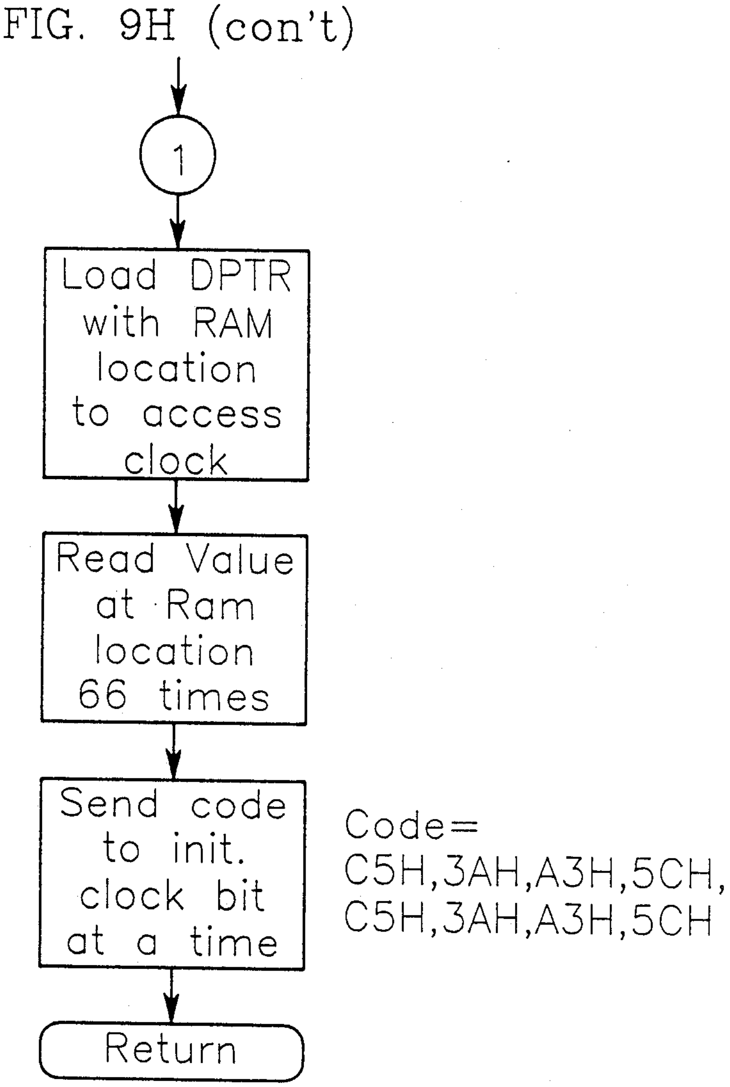
FIG. 9I-1
ROUTINE TO SET CLOCK
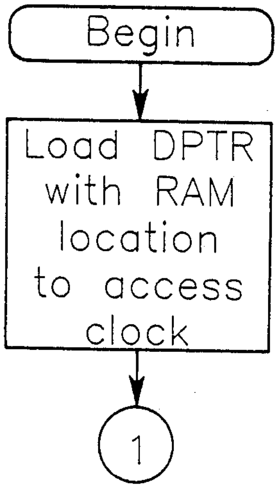

READ CLOCK

SEND CLOCK TO PC

MICROCOMPUTER TRAFFIC COUNTER AND DATA COLLECTION METHOD

BACKGROUND OF THE INVENTION

This invention relates generally to event data collection and more particularly to vehicle traffic counting and recording.

In the past, traffic volume counting has been performed by multiple channel field recorders which punched a binary code and/or printed the recorded volumes onto a paper tape. The paper tape media was then transported into the office for review and analysis. The paper tape recorders and media had many problems. They required many hours of time to transfer data into a usable format. For those who could afford an electronic reader, however, the time commitment was substantially reduced. Nevertheless, the reader was not without problems. The mechanisms would get dirty and erroneous information would be translated to the output, and if the punch of the original tape was not clean, and incorrect data would be transferred. Another problem was that software was not readily available to process data and produce needed results.

Solid state technology has created an environment that permits data to be stored electronically, thus reducing the need for human and mechanical interface. Solid state technology has also improved the accuracy of vehicular counting. Various forms of solid state equipment have been developed for use in traffic control and, more generally, for event data acquisition.

U.S. Pat. Nos. 3,397,305 and 3,397,306 to Auer, Jr. disclose solid state traffic volume measuring devices for counting vehicles passing a vehicle presence detector over periodic intervals of time, storing the count, or an average thereof, for each interval and resetting the counter. The count or average count is provided to a utilization device, which can be an indicator, a traffic signal control system, or a computer. U.S. Pat. No. 3,549,869 to Kuhn discloses a modular counting system that can be plugged into, or unplugged, from a traffic detecting system. U.S. Pat. No. 3,711,386 to Apitz similarly shows a traffic volume that provides traffic volume as percentage of a standard or reference unit volume. U.S. Pat. No. 4,258,430 to Tyburski also discloses a traffic counter, with a detachable, battery-powered random access memory unit so that stored count data can be transported from the field to an office-located computer for unloading data for further processing.

These systems all implement their particular functions in hardware electronics circuitry, although Tyburski mentions that a microprocessor could be used to perform the traffic detection and counting functions. It is also known to use a microprocessor in other, similar traffic control applications. For example, the Multisonics, Inc. 901 Controller is a microcomputer designed to control traffic signals based on traffic volume in each lane of traffic at an intersection. A typical quad intersection with a traffic lane and a turn lane in each direction has eight phases. The 901 Controller has a microprocessor, a program ROM, an addressable RAM, a clock, external inputs from traffic transducers and outputs for controlling operation of a traffic signal. The traffic volume computation, storage and signal control functions for each phase are implemented and coordinated in software. Thus, they can be changed more readily than in the foregoing hardware implementations. The 901 Controller, however, is designed for use at fixed locations, rather than at many, varied locations.

Other portable event tabulation and counting devices are known. U.S. Pat. No. 3,878,371 to Burke discloses an apparatus and method for compiling and recording data on the operation of vehicles, such as the number of times that the vehicle is started. U.S. Pat. No. 3,922,649 to Thome and U.S. Pat. No. 3,959,633 to Lawrence disclose electronic watchman's tour recording devices. Data is recorded in the portable unit and then the unit is returned to an office-located computer to unload the data for further processing.

All of the foregoing designs have several drawbacks. One drawback is that their adoption typically requires the user to discard all prior equipment and replace it with an entirely new system. This entails considerable capital expense. As a result, in the connection with traffic counting, many traffic departments cannot afford the costs of changeover. Consequently, many are still using the obsolete paper punch systems. Another drawback is that prior traffic volume data acquisition systems require initialization. The procedure can be rather complex, beyond the ordinary skills of traffic field workmen. Besides setting the machine to operate as desired, the workmen must correctly log various kinds of information, and this information must be correctly input to the office-located computer for correlation with the recorded data. As a result, mistakes in setting the traffic counters and logging information can be and frequently are made, sometimes causing many valuable days of data to be lost or improperly recorded or processed. Another drawback is that many of these designs, particularly those disclosed in Tyburski, Lawrence, Thome and Burke, require that the data module be taken into the office and plugged into an expensive reader or interface unit for inputting the data to a computer.

Accordingly, a better, more economical system is needed for recording traffic volume and other forms of event data.

SUMMARY OF THE INVENTION

One object of the invention is to provide an improved method and apparatus for event tabulation.

Another object of the invention is to simplify the equipment and methods used for counting traffic volume in the field and returning data to an office-located computer for processing.

A further object is to provide a traffic data collection system that meets the needs of the transportation professional as well as the budgetary constraints of the industry.

Yet another object is to enable prior traffic counting systems to be retrofitted economically and without discarding all prior apparatus, as well as provide a stand alone unit.

An additional object is to make it easy and foolproof for relatively unskilled workmen and data entry operators to collect traffic data and transfer the data, together with proper correlating information, into another computer for further processing away from the field data collection site.

The invention provides a portable, microprocessor-based data collection unit that can be plugged directly into traffic detection apparatus for recording event data, such as traffic volume, disconnected from the traffic detection apparatus without loss of data, and plugged directly into a personal computer to unload the data, communicating via a cable without any additional interface device or reader. Developed with retrofitting in mind, with its own microprocessor, and battery-powered real time clock and data storage all interconnected in one circuit, the data collection unit is capable of standing alone. Its electronics do not need the support of additional circuits. Thus, it can use existing air switches/loop detectors and power supplies of prior traffic counters.

The microprocessor, with suitable programming software burned into an EEPROM, allows each unit to operate as a microcomputer for interchangeably collecting traffic data and unloading the data to another computer via a common connector. Upon initialization, the program instructs the microprocessor to sample various ports in the connector to determine whether to operate in a field mode or an office mode.

When connected as part of a traffic data collection and storage system, the unit receives electronic information as an external signal input via the connector through a parallel peripheral interface. The microprocessor software determines that the unit is connected to a traffic transducer and transfers control to software that receives and processes traffic detection signals. A real time clock provides a digital indication of time to the microprocessor. The user enters a desired sampling interval by means of simple controls on the front of the unit. The software causes the microprocessor to begin accepting traffic detection signals when the real time matches the beginning of the next sampling interval. These signals are processed by the microprocessor, under control of transducer signal debouncing software, stored in a temporary location in the processor's internal RAM, and added to the contents of an accumulator register in the microprocessor. Upon completion of a timed interval, the accumulator register contents, and an initial real time, are then written to a data storage RAM. The software for determining when an interval time is out and transferring data to the storage RAM is designed to minimize chances of missing an input signal while processing and, together with the debouncing software, produces a data accuracy within about 1%.

When stored information is to be retrieved, the unit is disconnected from the traffic detection apparatus and connected through a direct cable connection with a computer. The microprocessor software determines that the unit is connected to a computer and transfers control to software that unloads stored traffic data via a communications circuit and software handshaking protocol for processing by the computer. This data can include both start time and time intervals so that the operator need enter only information about the location where the data was taken. The data can then be manipulated to produce any desired reports.

The real time clock and data storage RAM are preferably powered separately from the microprocessor by a battery. In the field, the microprocessor and parallel interface circuitry are powered by the power supply for the traffic detection apparatus. A separate power supply can be used to power the microprocessor and communications circuitry when connected to the computer in the office.

The input signals can be from most electrically occurring or transducible events. Generally, they are in the form of an electrical pulse or similar signal in which the number of occurring signals are indicative of a specific series of events. The computer can be an office-located desktop computer or a portable "lap-type" computer. This affords the user the opportunity to retrieve data to a file while in the field. Once the individual is back in the office, appropriate reports can be generated and filed, electronically or by hard copy.

The foregoing and other objects, features and advantages of the invention will become more readily apparent from the following detailed description of a preferred embodiment, which proceeds with reference to the accompanying drawings.

BRIEF DESCRIPTION OF DRAWINGS

FIG. 1 is a pictorial view of a traffic recorder in accordance with the invention.

FIG. 2 is block diagram showing the traffic recorder of FIG. 1 connected to traffic detectors for traffic recording in the field.

FIG. 3 is a diagram of a male end of a multi-pin connector wired in accordance with the invention for use with hose-type traffic detectors.

FIG. 4 is a diagram of a male end of a multi-pin connector wired in accordance with the invention for use with inductive-loop-type traffic detectors.

FIG. 5 is block diagram showing the traffic recorder of FIG. 1 connected to a personal computer for unloading traffic data recorded in the field.

FIG. 6 is a diagram of a cable with female multi-pin connector ends wired in accordance with the invention for connecting the traffic recorder as shown in FIG. 5.

FIGS. 9A through 9K are flowcharts of various routines called in office operation of the traffic recorder.

FIGS. 10-1 through 10-5 are flowcharts of the software routine "Microcounts PROM" for controlling field operation of the traffic recorder.

FIGS. 11-1 through 11-7 are flowcharts of the software routine "Count Routine Flow Chart" for programming the microcomputer of FIG. 7.

FIGS. 12-1 through 12-4 general flowcharts of the software routine "Office Software - PROM" using the software of FIGS. 9A-9K.

Figure 8:
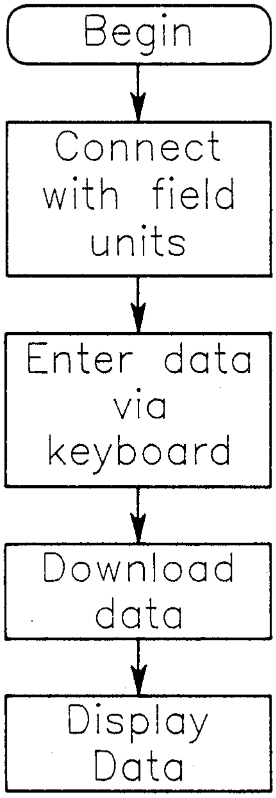
FIG. 8 is a flowchart of the software routine "Microcounts - PC" for programming the computer of FIG. 5.

Appendices A and B are listings of portions of the software of FIG. 8 for establishing a connection and communicating between the traffic recorder and the personal computer.

Appendices C and D are listings of the personal computer software routines for unloading traffic data from a single channel and a dual channel traffic recorder, respectively.

DETAILED DESCRIPTION

Figure 7:
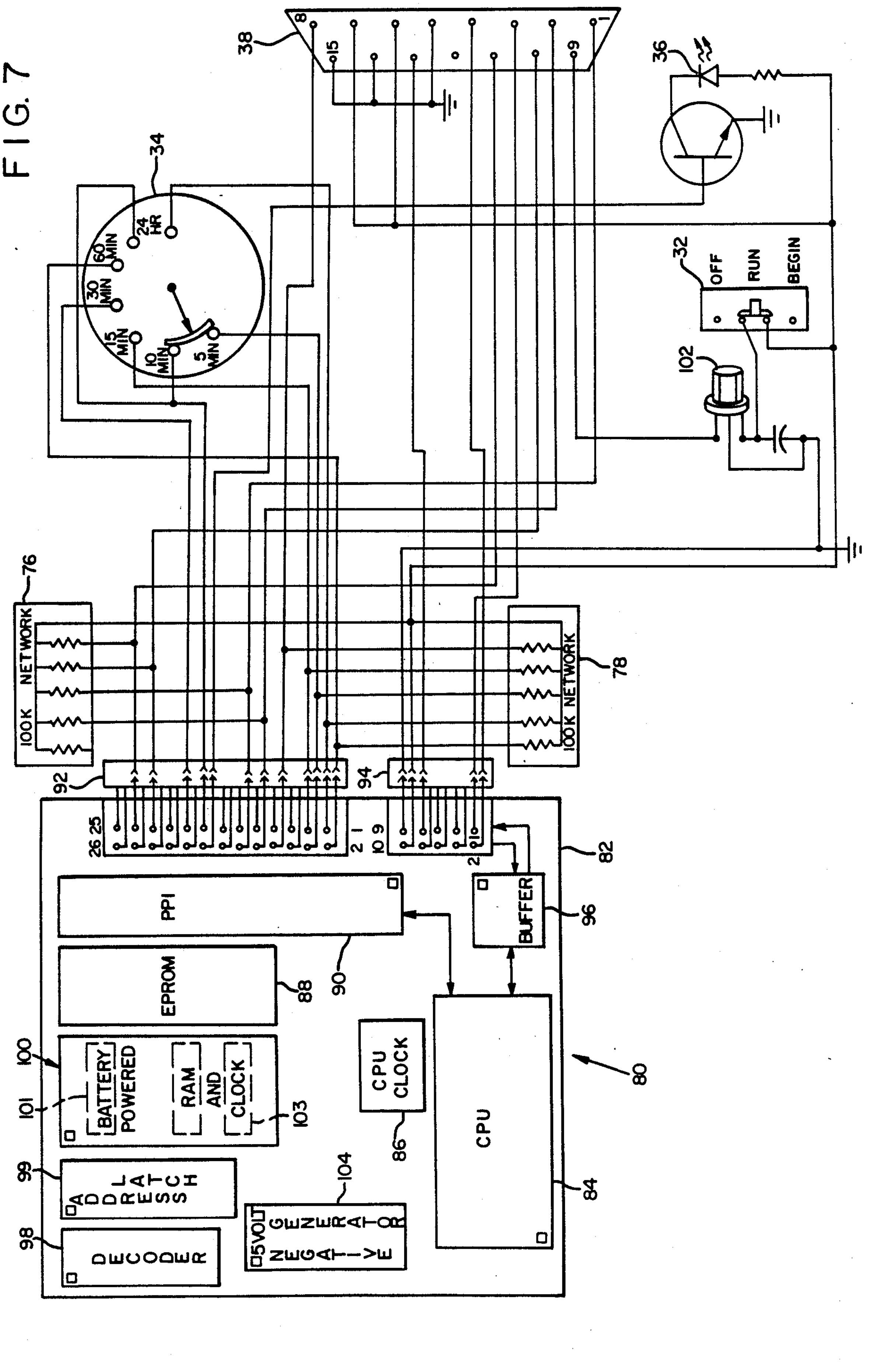
FIG. 7 is a schematic diagram of the microprocessor, with battery-powered RAM and real-time clock, and interface and user-control circuitry of the traffic recorder of FIG. 1.
Figure 9A:
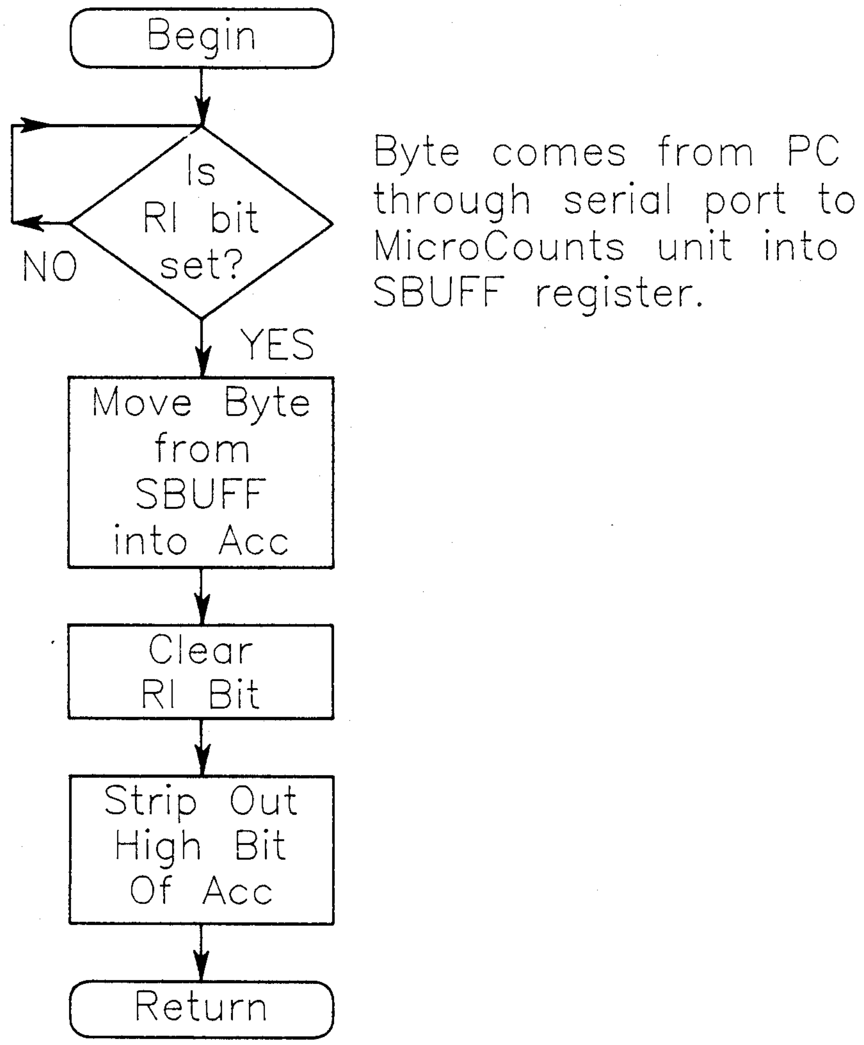
Figure 9B:
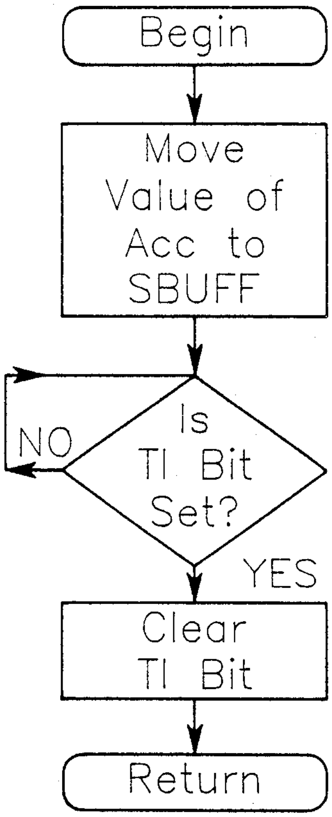
Figure 9C:
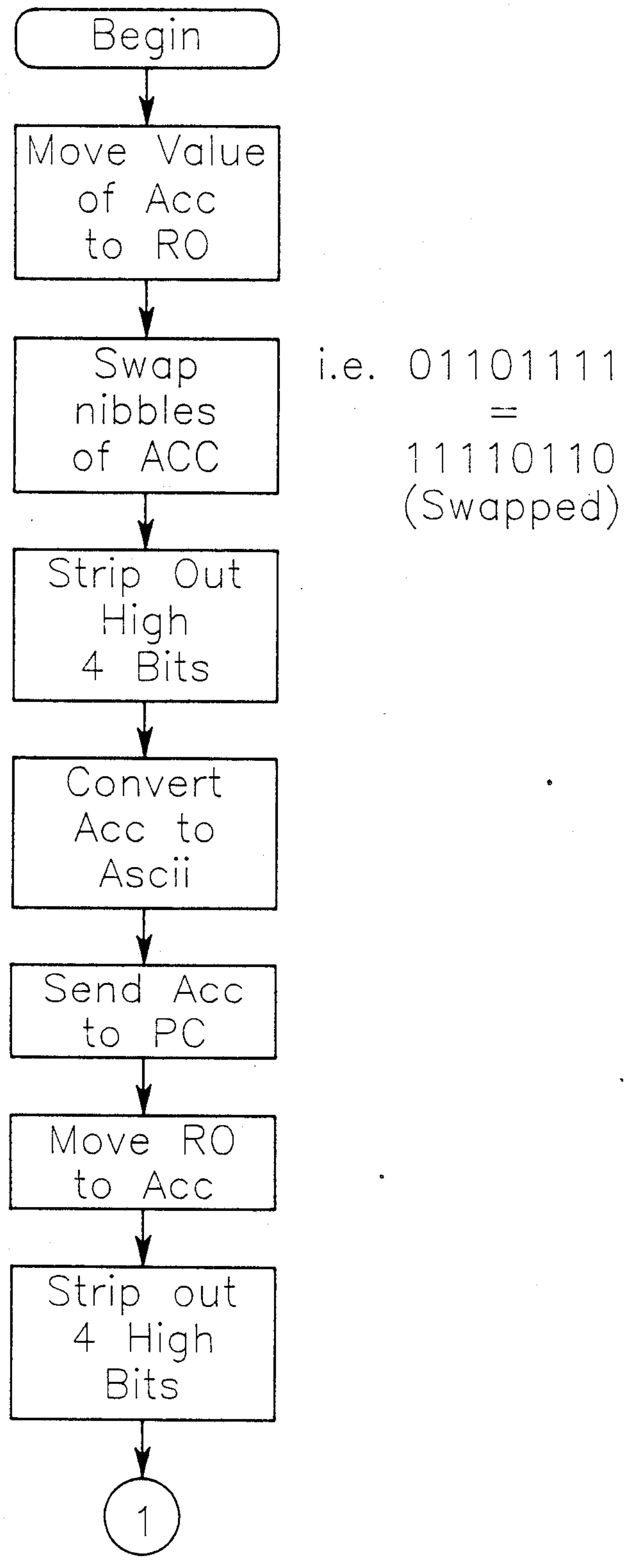
Figure 9D:
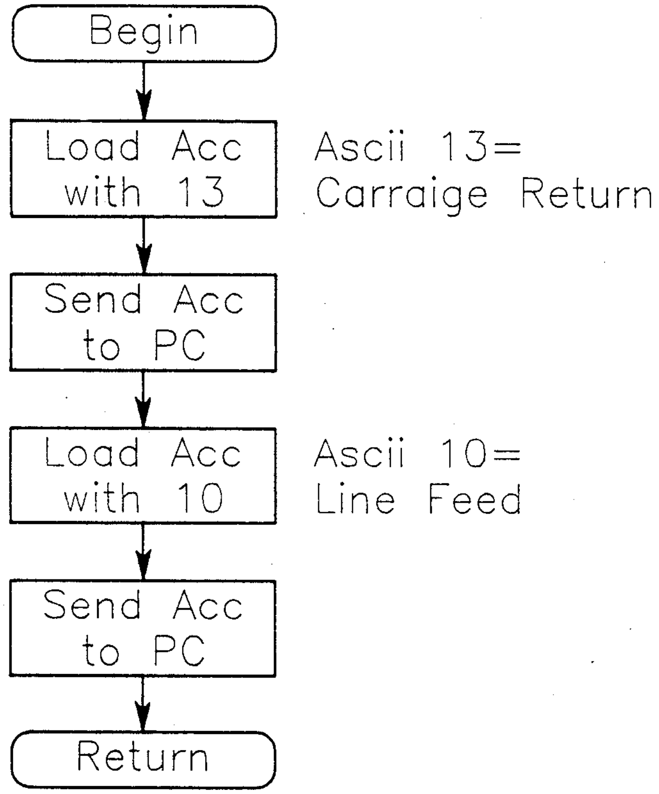
Figure 9E:
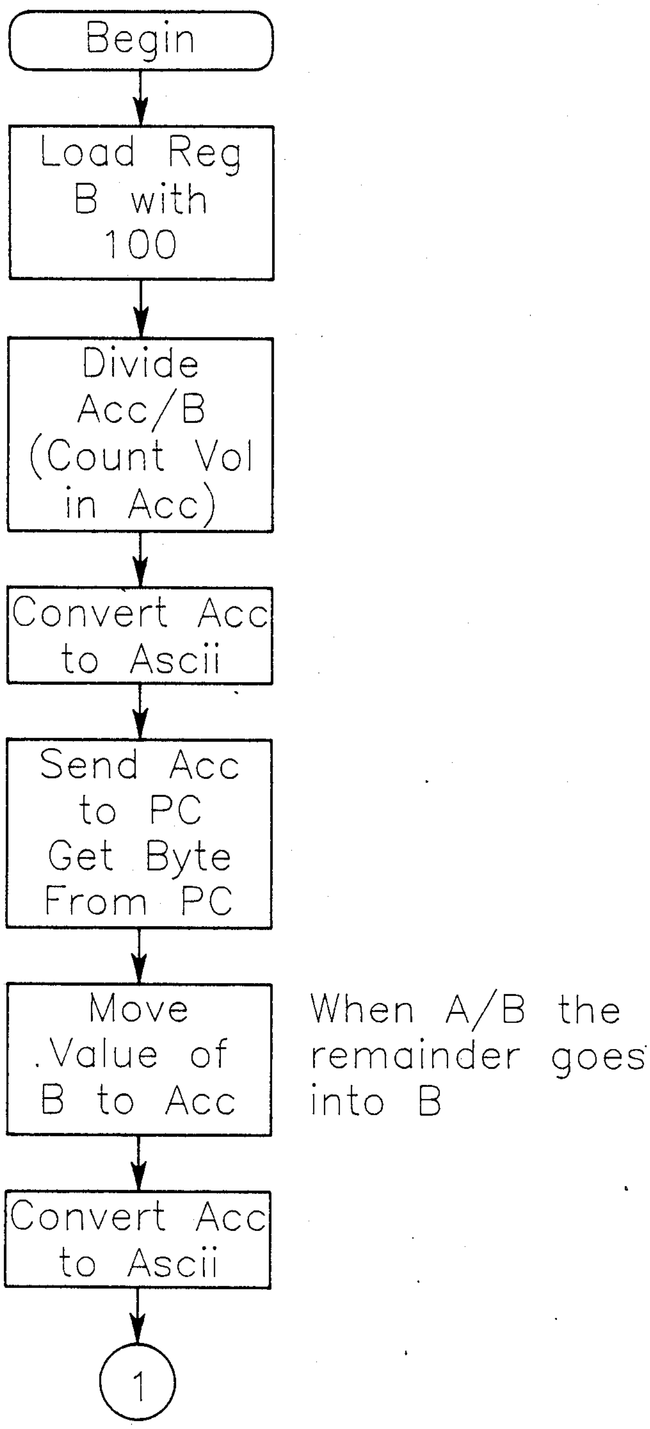
Figures 1, 9F:
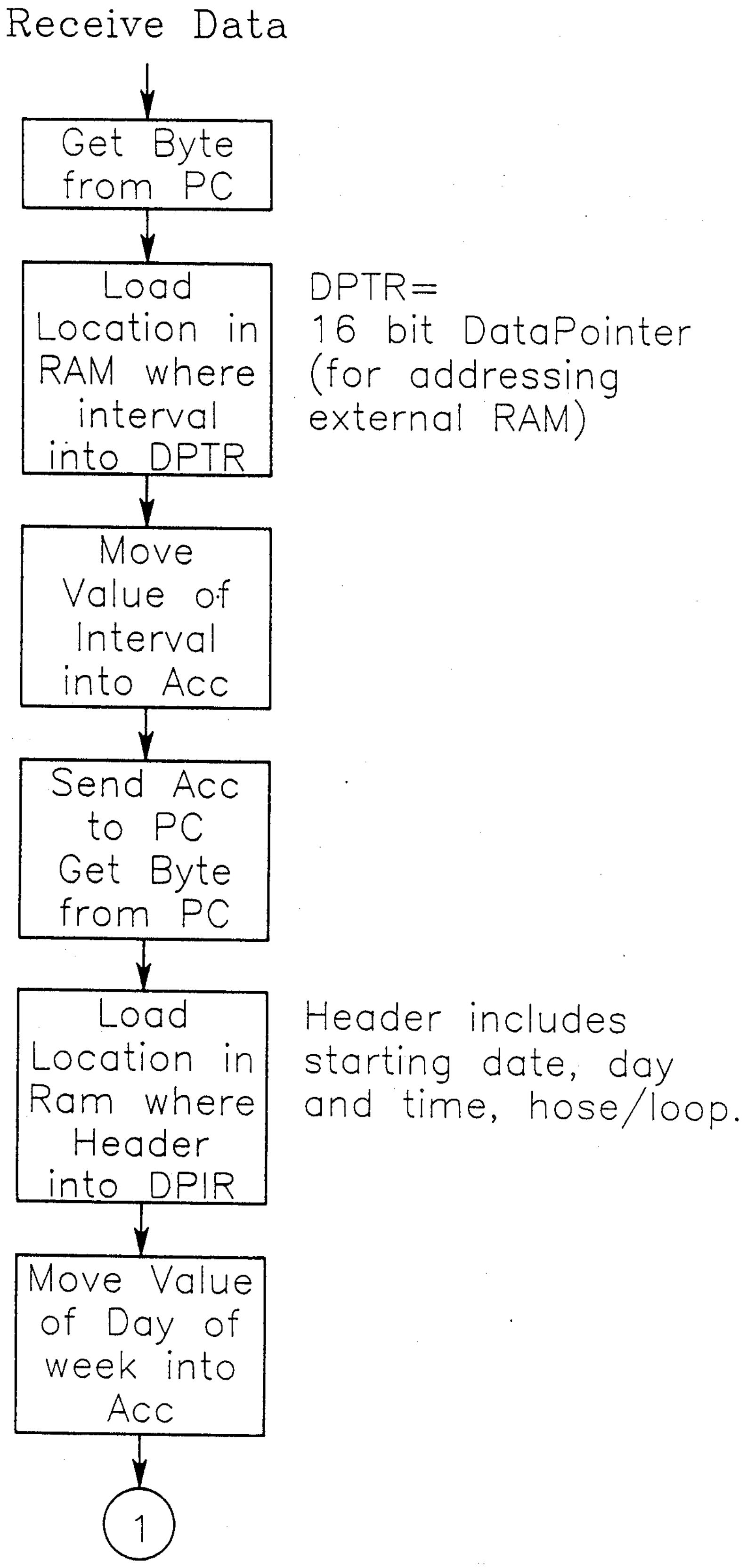
Figures 2, 9F:
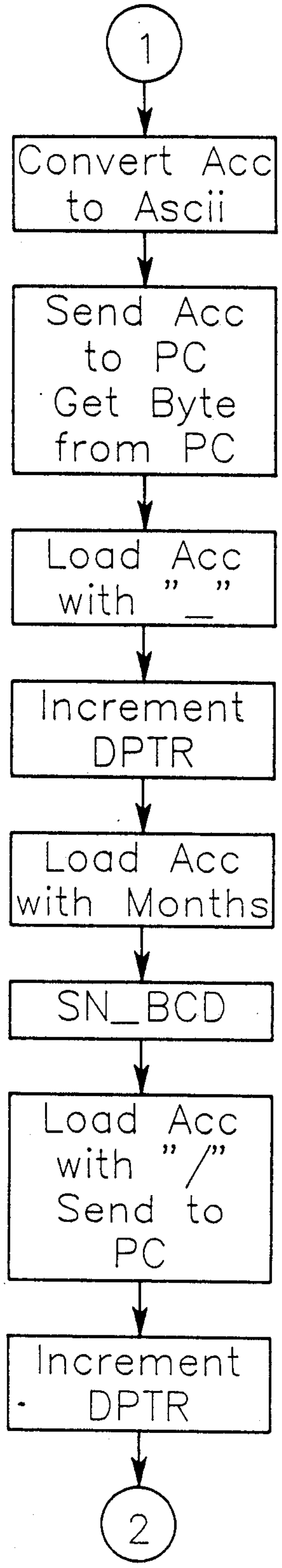
Figures 3, 9F:
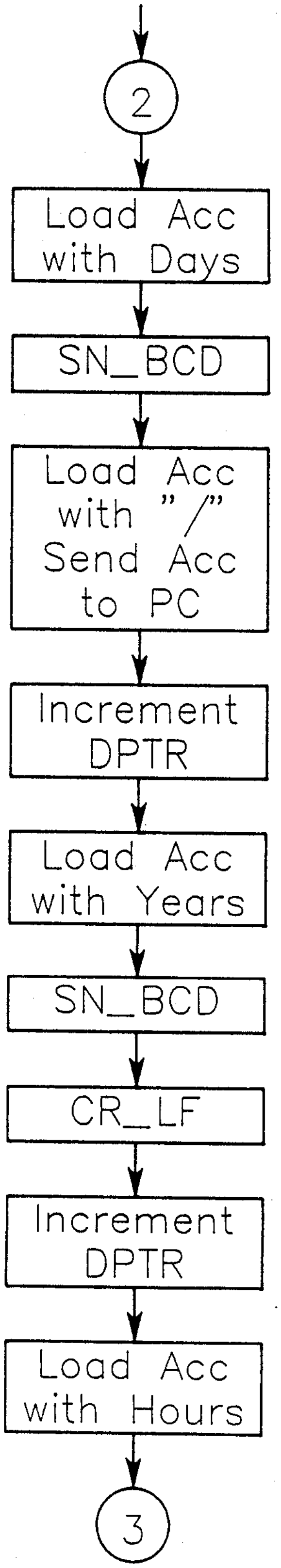
Figures 4, 9F:
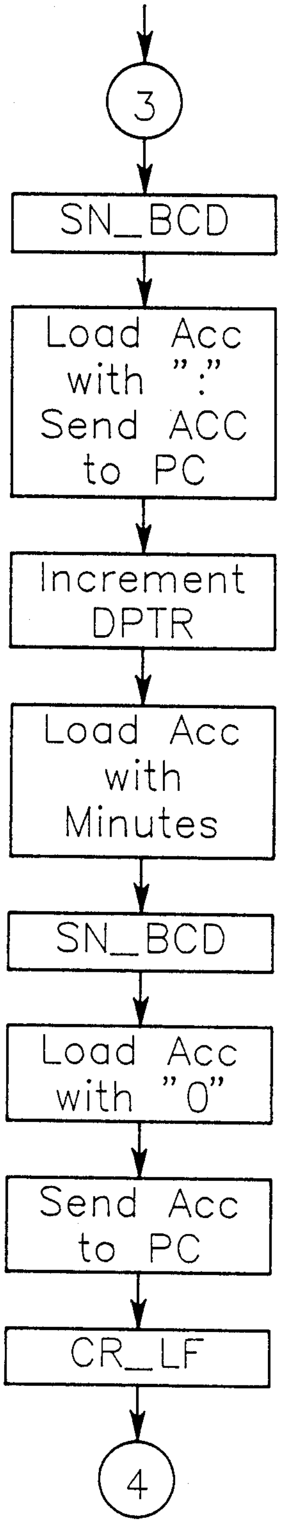
Figures 5, 9F:
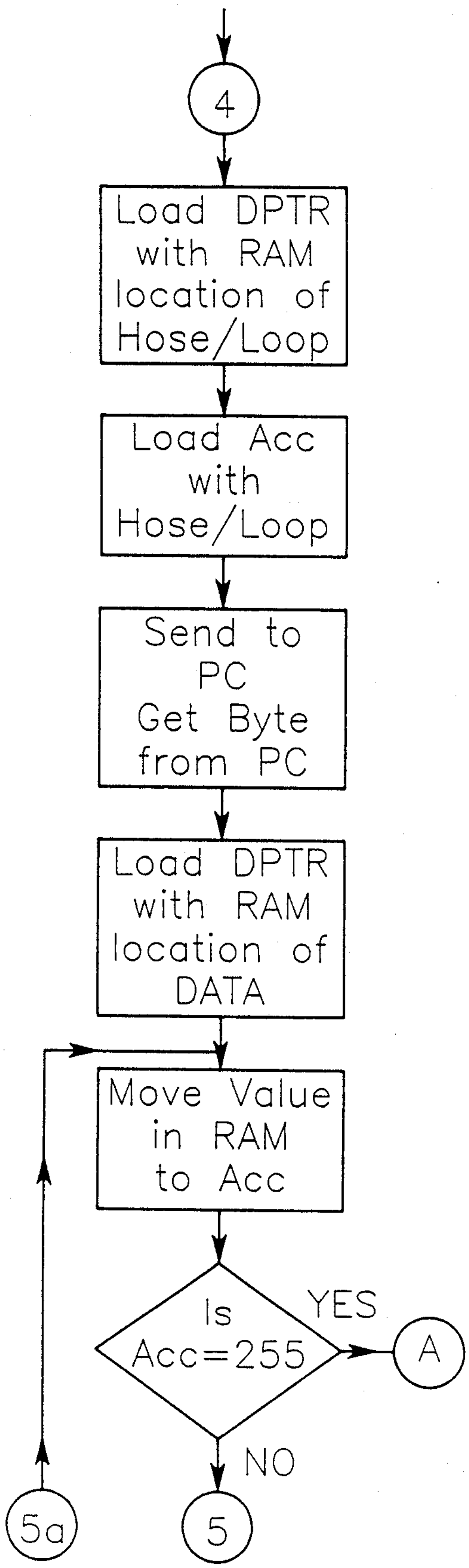

Referring to FIGS. 2 and 5, a traffic recording and data collection system according to the invention includes a traffic recorder 10, shown in greater detail in FIG. 1 and FIG. 7, traffic detection means 12 for detection of events such as vehicles passing through an intersection, and data processing means 14 for collecting and further processing data collected in the field by one or more traffic recorders.

Field Data Recording

In the field, the traffic recorder 10 is connected to a conventional transducer 16 which is connected, in turn, to a conventional traffic detector 18, such as a hose laid across a street or an inductive loop embedded in the payment of a street. Optionally, a second transducer 20 and traffic detector 22 can be connected to traffic recorder 10. A conventional field power supply 24, usually a battery, provides a source of DC power to the transducers. This power supply is also used to power portions of the electrical circuitry of traffic recorder 10, as further described below.

As shown in FIG. 1, the traffic recorder 10 is a modular unit enclosed in a plastic housing 26 sized to be conveniently held in a person's hand. On the front of the unit is an erasable site identification panel 28 and a control panel 30. The user can conveniently enter information on panel 28 about the location in which the recorder is used, for entry in the data processing means 14 when the unit is returned to the office. The control panel is extremely simple, including a three-position slide switch 32, a rotary interval selector 34, and an LED indicator which flashes each time a traffic event is recorded. A multi-pin connector female end 38 is mounted in the upper end of the casing 26. This connector has pins 1, 2 and 8 connected to port A, and pins 10 and 11 to port B, of a parallel peripheral interface circuit, pins 3 and 4 connected to a serial communications buffer, pins 5, 13, 14 and 15 connected to ground, pins 6 and 7 connected to a +5 volts source in the unit, pin 9 connected to a regulator to input external power to the unit, and pin 12 is unused. The rotary switch provides 5, 10, 15, 30, 60 minute and 24 hour intervals for the user to set the time interval over which data is to be collected. The slide switch has a springloaded "Begin" position which is pressed, after setting the rotary switch, to start the unit counting. The LED will flicker for 3 seconds to indicate that it is properly connected and initiated. Then it will blink whenever another vehicle is recorded. The slide switch remains in the "Run" position until data collection is to be ended, and then moved to the "Off" position.

In the field, the traffic recorder 10 is housed, together with the transducer 16, 20 and field power supply 24 in a conventional, weather-tight box (not shown). The traffic recorder is connected to the transducers and power supply, through a multi-pin male end connector 40 by a two-conductor cable 42 to the power supply and two- or three-conductor cables 44, 46 to each of the transducers.

Connector Arrangement

The number of conductors in the transducer cables depends on the type of traffic detector. FIG. 3 shows cable end **40*a* having three wires forming cable 44*a* for connection to a hose-type detector FIG. 4 shows a connector end 40*b* with two conductors 44*b* as used to connect to an inductive loop-type detector. Additionally, in accordance with the invention, each of these connectors is differently wired, with jumper wires between selected pins. The connections of the jumper wires at these pins are read by the traffic count recorder to provide it with information about the type of traffic detector to which it is connected. As further explained below, this information is used to control the operation of the traffic recorder In both connectors 40*a* and 40*b*, external power is provided via cable 42 to pins 9 and 15. Similarly, in both connectors, both types of traffic detectors have signal cables A and A− connected to pins 10 and 14, respectively. The field connectors also both have pins 7 and 8 connected together by a jumper 48. Pins 1 and 5 are likewise connected by a jumper. Pin 5 is grounded in both connectors. The hose connector 40*a* additionally has a conductor A+ connected to pin 6. Connector 40*a*, for a hose-type detector, has pins 1, 2 and 5 interconnected by jumpers 50, 52, and thereby grounding pin 2. In connector 40*b*, for an inductive loop detector, a jumper 54 connects pins 1 and 5, and a jumper 56 connects 2 and 6, thereby setting Pin 2** to +5 volts. In the case of each form of connector, the remaining pins are available for connection to a second, optional transducer of the same type.

Office Arrangement

Once data has been collected in traffic recorder 10 in the field, it is unplugged from connector 40 and connected tO the data processing means 14 as shown in FIG. 5. The data processing means includes a conventional personal computer 60, connected to a keyboard 62 and CRT display 64 in conventional manner. Conventionally, personal computer 60 has a serial communications port. The traffic recorder is connected to the computer by means of a connector male end 66 plugged into female end 38, a three-conductor cable 68 and a multi-pin connector male end 70 plugged into the serial communications port of the personal computer. DC power is provided to traffic recorder 10 by an office power supply 72, typically an AC to DC converter, through a two conductor cable 74.

Figures 6, 9F:
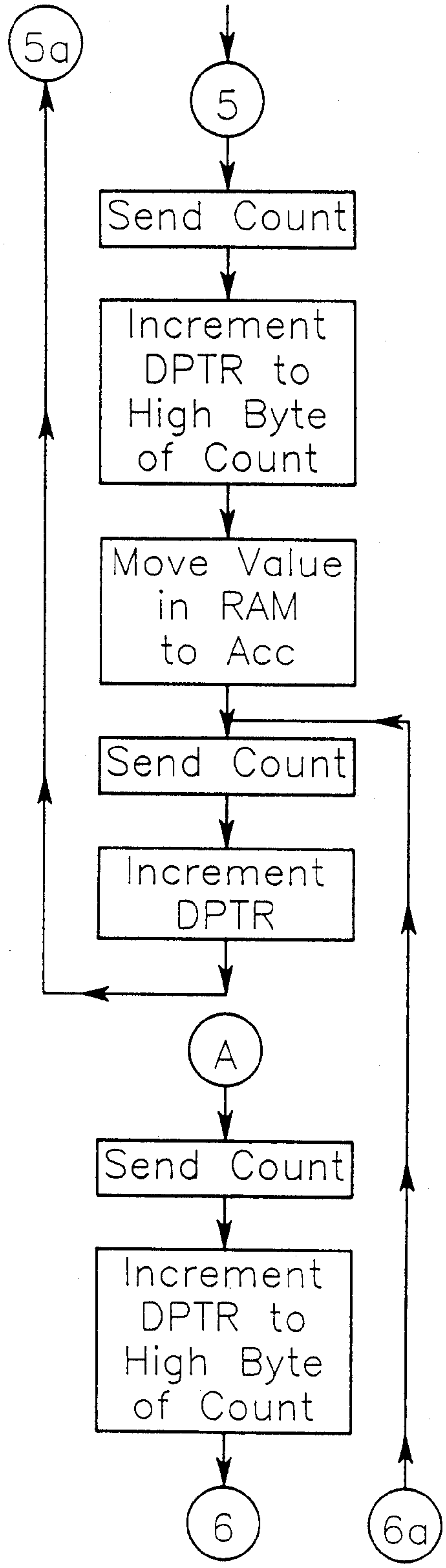
Figures 7, 9F:
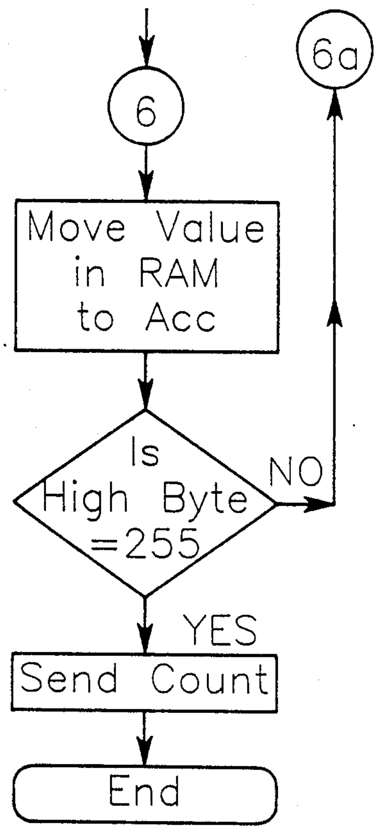
Figure 9G:
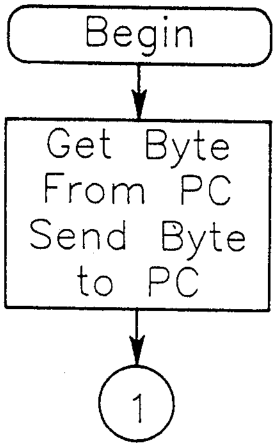

Connectors 66, 70 and associated cabling are shown in FIG. 6. Pins 9 and 15 of connector end 66 are connected to the power supply via cable 74. Conductor **68*a* connects pin 5 of connector end 66 to pin 7 of connector end 70. Pins 2 and 3 of connector end 70 conventionally provide serial communications input and output ports in a personal computer. Pin 2 is connected to pin 3, and pin 3 to pin 4, respectively, of connector end 66, to enable serial communications between the personal computer and traffic recorder 10. In contrast to the connector ends 40*a*, 40*b*, none of the other pins of connectors 66, 70 are jumpered together. Specifically, pins 7 and 8 are unconnected so that pin 8** provides a logical low signal.

Following a more detailed description or the internal circuitry of traffic counter 10, the operation of the preferred embodiment of the invention will be described in greater detail by reference to the accompanying flow charts and software listings for both the traffic recorder 10 and personal computer 60.

Traffic Recorder Circuitry

Referring to FIG. 7, the slide switch 32, rotary switch 34, LED 36 and connector female end 38 are shown on the right side of the drawing, together with their accompanying circuitry. Connected to these elements and circuitry through a biasing network 76, 78 is a microprocessor 80 constructed on a single printed circuit board 82. The microprocessor is largely conventional and so is described and illustrated only insofar as relevant to the present invention. A suitable form of microprocessor is provided by the MC2i microcontroller commercially available from Basicon, Inc. of Portland, Oreg. It includes a microprocessor or CPU 84 (Intel 80C31), a CPU clock 86, and a EPROM 88 for containing software instructions for the CPU. Data is input to the CPU through a parallel peripheral interface 90 from rotary switch 34 via connector 92 and from connector 38 through connector 94. Serial communications are provided through an RS-232 buffer 96 which is connected through connector 94 (pins 1 and 2) to connector 38 (pins 3 and 4). After processing in the CPU, the traffic data is transferred, via decoder 98 and address latch 99, to a random access memory 100.

External DC power is provided through pin 9 of connector 38, regulator 102 and slide switch 32 to a negative 5 volt power supply 104 on PC board 82. Power is supplied, in turn, from supply 104 to the previously described elements of the microcomputer, except for the random access memory.

The random access memory (RAM) is mounted in a separate, battery-powered socket 100. Embedded within the socket is a lithium battery 102 which retains RAM data when the traffic counter is unplugged from other power supplies. The socket also includes a real-time clock 103 that provides time, date and day. The socket battery maintains the clock in operation when power is unplugged from the recorder. The above-described socket is suitably provided by the model DS1216 SMARTWATCH TM commercially available from Dallas Semiconductor Corp. of Dallas, Tex.

OPERATION

General Arrangement of Field Operation

Traffic recorder 10 was developed with retrofitting in mind. Having its own microprocessor, real-time clock and data storage media all integral in one small, portable unit, its electronics do not need the support of additional components. Thus, it can use existing air switches/loop detectors and power supplies. The conversion is simple. Simply open the existing counter enclosure, remove the electromechanical hardware, leaving the air switches/loop detectors and power supply, connect the cable that comes with the traffic recorder unit, and plug the unit into the other end of the cable.

The retrofit concept also permits the user to convert an existing single hose counter into a dual hose counter. This is accomplished by drilling an additional hole adjacent to the existing air switch, installing a new air switch and connecting a dual channel traffic recorder unit to the existing hardware.

Traffic recorder 10 can also be provided as a part of a complete unit, complete with air switches, batteries and exterior enclosure. The traffic recorder unit 10 can, of course, be removed from the enclosure and used interchangeably as a retrofit unit. In any case, for field operation, the traffic recorder 10 is connected to transducers as shown in FIG. 2.

Since the traffic recorder unit has its own microprocessor, clock, program and data memory, and support circuitry, it can operate as a microcomputer. The processor is driven by a program, burned into the EPROM 88. The program in turn instructs the microprocessor to sample various ports in connector 38 by setting certain bits high and low, reading the internal real-time clock and recording certain events.

The following sections describe, with reference to the software, the process of initialization, collecting data, processing collected data, storing collected data, and communicating stored data directly from the traffic recorder 10 to computer 60 through serial communications cable and connectors 66, 68, 70. Also described is the process by which the real-time clock dictates when data is written to RAM. The following section explains the procedure in which the processes of initialization and collecting and storing traffic data in the field are accomplished. The succeeding section describes how stored data is unloaded from unit 10 to computer 60 for subsequent processing away from the field data collection site.

Field Operation of Traffic Recorder

The traffic recorder unit 10 is powered up by switching slide switch 32 to the "Begin" position. Upon power-up, the microprocessor 84 operates under control of the routine flowcharted in FIG. 10-1 to 10-5. Proceeding from the power-up step 110, the CPU is instructed in step 112 to set various constants and equates. These parameters are set at specific locations in the CPU RAM. The parameters are as follows:

1. Set locations for the hours, minutes, seconds, and the months, days and year from the real-time clock;
2. Set the high and low bytes for the counters of channels "A" and "B";
3. Set location for the hose/loop code;
4. Set location for interval code; and
5. Set location where actual data begins.

The program then instructs the processor, in step 114, to initialize and read the real-time clock. The parallel peripheral interface (PPI) 90 is then initialized in step 116 after a small delay to permit it to "power-up." The RS 232 buffer 96 is initialized in step 118 for 4800 baud rate. Then, in step 120, FIG. 10-2, port A is read to see if the unit is in the office or the field. Port A refers to a byte that reads external inputs through the parallel peripheral interface. Bit 4 of port A is connected to pin 8 of connector 38. If pin 8 is high, it indicates connection to a field connector **40*a* or 40*b*; if low, it indicates connection to the office cable connector 66**.

At this point a decision is made, as shown by step 122. Prior to this point, the traffic recorder operates the same in the field as in the office: instructions were merely given and executed. Now, the unit tests the connections at the connector end plugged into connector end 38 to determine whether it is connected to a transducer or a computer serial port connector. (The sampling of the ports is done in various ways that will be explained later.) The following describes the field option.

The microprocessor is instructed in step 124 to light a light-emitting diode (LED) for a timed interval of three (3) seconds. Upon completion of the above routine, in the method of step 126, the processor is instructed to look at the rotary switch 34 which determines the timed interval. The method is as follows:

1. Send out plus (+) five (5) volts on port C bit 1;
2. Read port A and strip out four (4) high bits;
3. Make comparison with predetermined parameters (depending on intervals desired) specifically, if Port A=13, then Interval=15; and if Port A=11, then Interval=30;
4. If no match is found (step three above), send out plus five (5) volts on port C bit two (2);
5. Same as step 2;
6. Make comparison with predetermined parameters (as discussed in step three) specifically, the data are interpreted as follows:
   Port A=11 then Interval=60
   Port A=14 then Interval=5
   Port A=13 then Interval=10
   Port A=7 then Interval=24 Hr;
7. Write interval into CPU RAM.

Figures 1, 10:
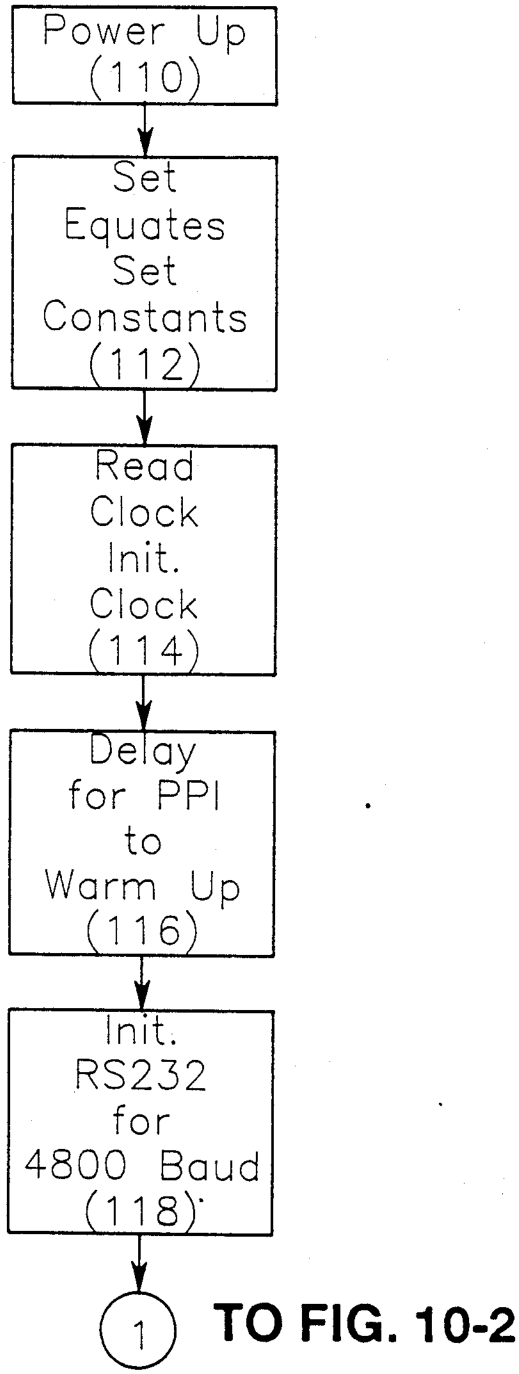
Figures 2, 10:
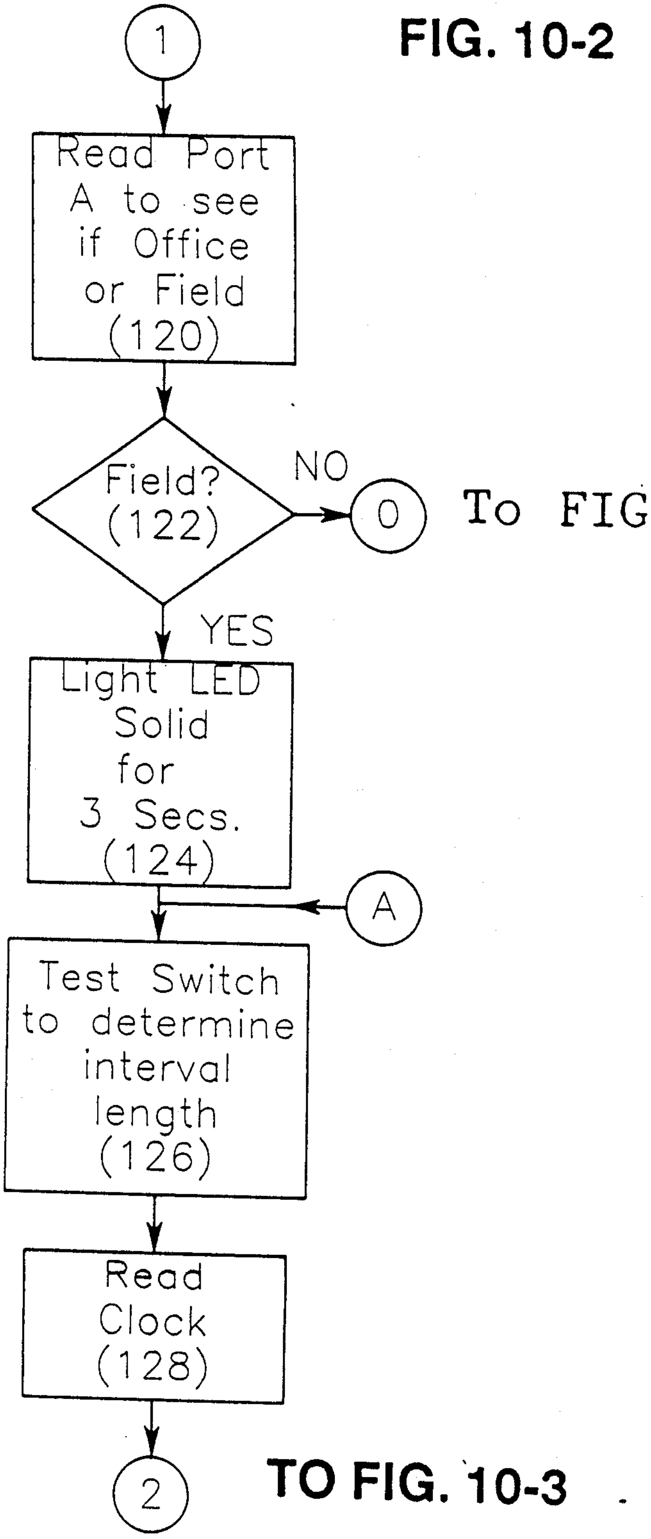
Figures 3, 10:
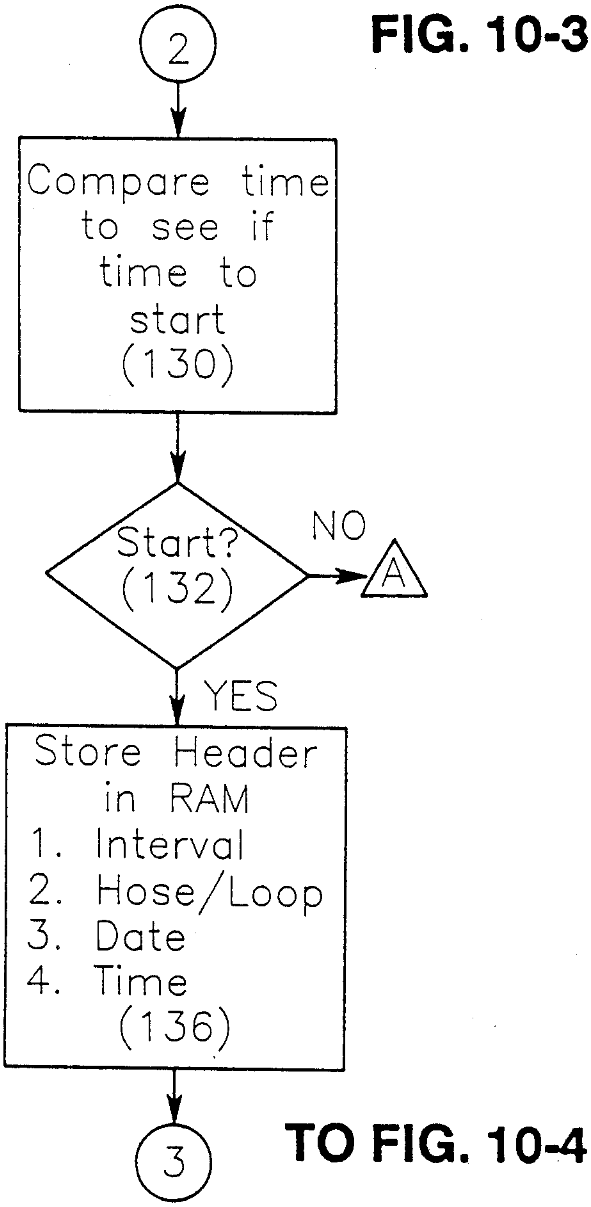
Figures 4, 10:
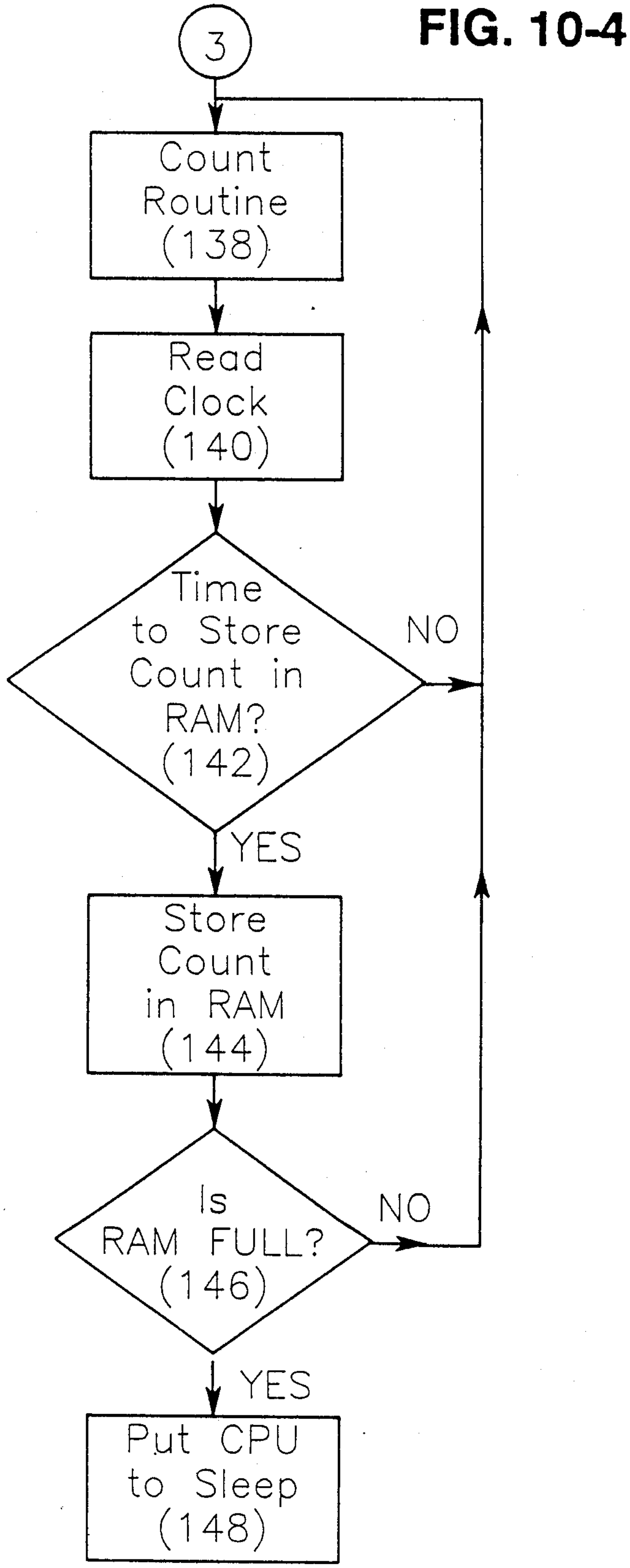
Figures 5, 10:
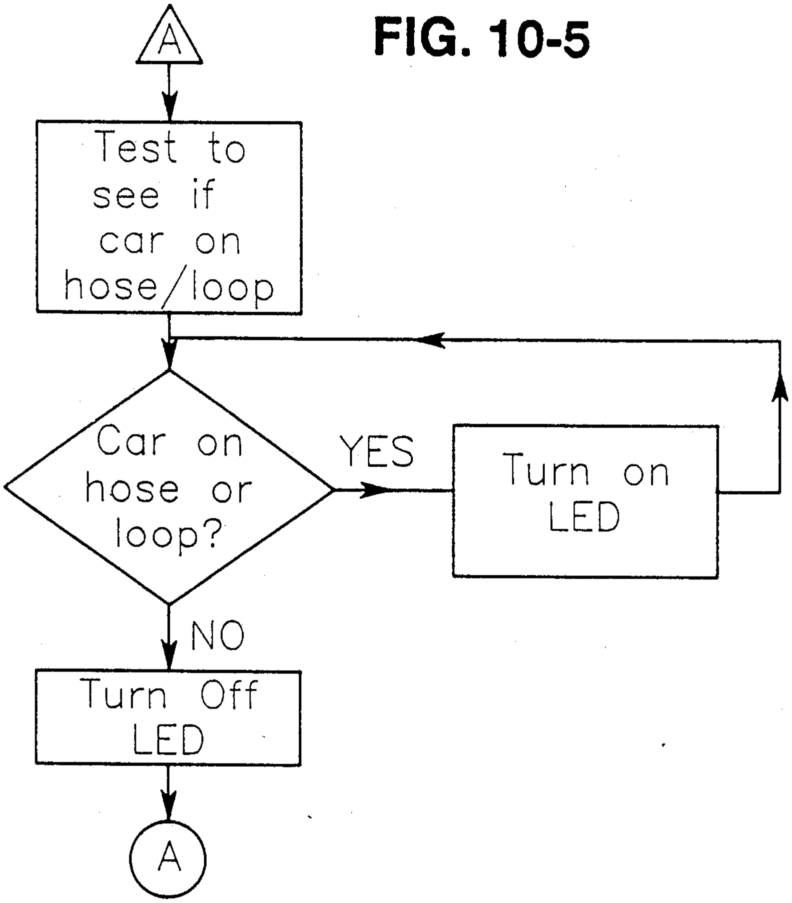

The real-time clock 104 is then read in step 128 and compared to the switch setting in step 130 (FIG. 10-3)

to see if it is time to start. If the answer to the question is "no," the program branches at step 132 to subroutine 134, which instructs the processor to look at port B to see if there is an input, zero (0) voltage. If so, an LED is lighted for the duration of the input, then instructed to be turned off. The real-time clock is continually being polled during this subroutine via steps 126–132 to determine if it is time to start accumulating recorded events.

If the answer to the question at step 132 was "yes," the following procedure is followed:

1. Store all information located in various locations in the CPU RAM as header information in the RAM (step 136).

2. Read port A, bit 5 which corresponds to pin 2 of connectors 38, *40a*, *40b*, to determine whether the unit is connected to a hose or loop detector. If a hose detector, then write a "2" into the header information in RAM; if a loop detector, write a "1" (this is done to provide a denominator for dividing the number of pulses read by each type of detector—the hose detector provides 2 pulses for each vehicle).

3. Upon execution, begin count routine (step 138 FIG. 10-4), which branches to subroutine 134 to include lighting of the LED as mentioned in the previous paragraph. The count routine is discussed in detail below with reference to FIG. 11. Briefly, it is preferable for one to count occurrences of events, such as vehicles passing over the transducers. Between the time that the interval is initiated and the next interval is encountered, all accrued occurrences are accumulated in the CPU RAM. This is accomplished by decrementing a counter in the CPU. This routine can include other forms of event tabulation known in the art, such as a running average of occurrences. The real-time clock is continually read (step 140) and compared to the time interval setting (step 142). If a given parameter is not satisfied, then the processor stays in the count loop (steps 138–142) until such time as the given parameter is encountered. At such time, in step 144, all accrued occurrences (or other traffic data) are written to RAM 100. Then, in step 146, the program tests to see if the RAM 100 is full and, if not, returns to step 138. Once the RAM is filled, the CPU is put to sleep at step 148.

Figures 1, 11:
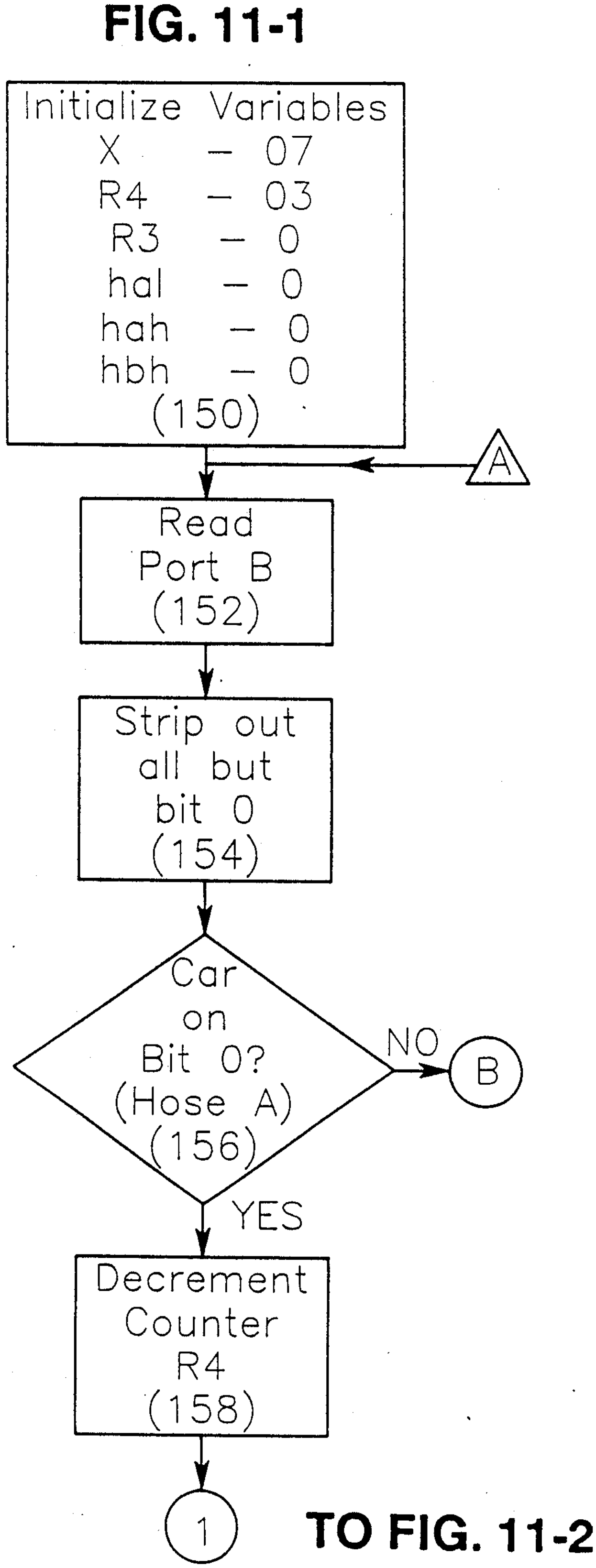
Figures 2, 11:
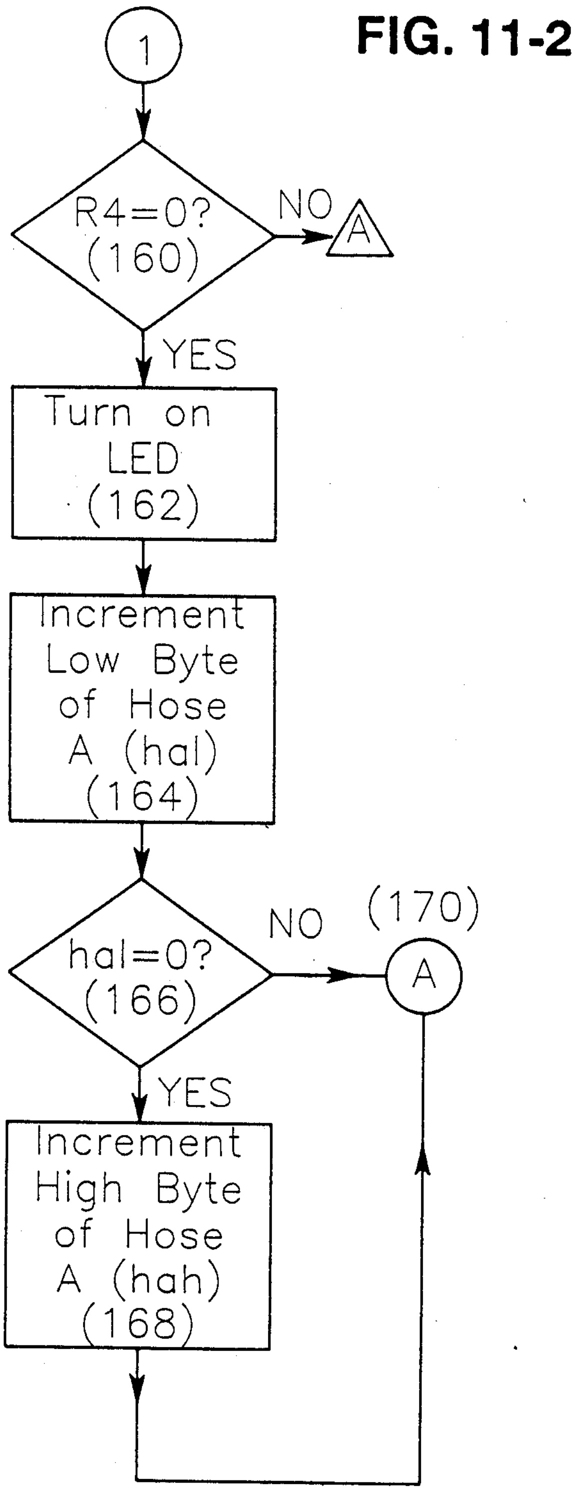
Figures 3, 11:
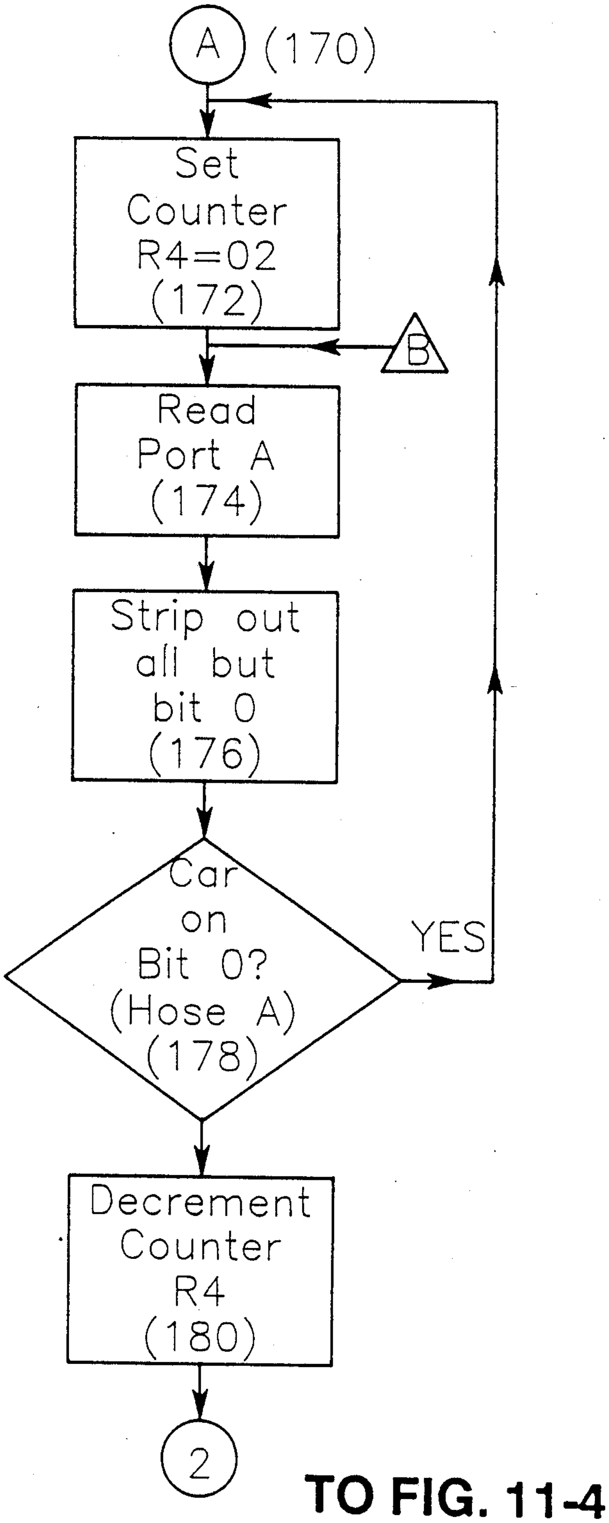
Figures 4, 11:
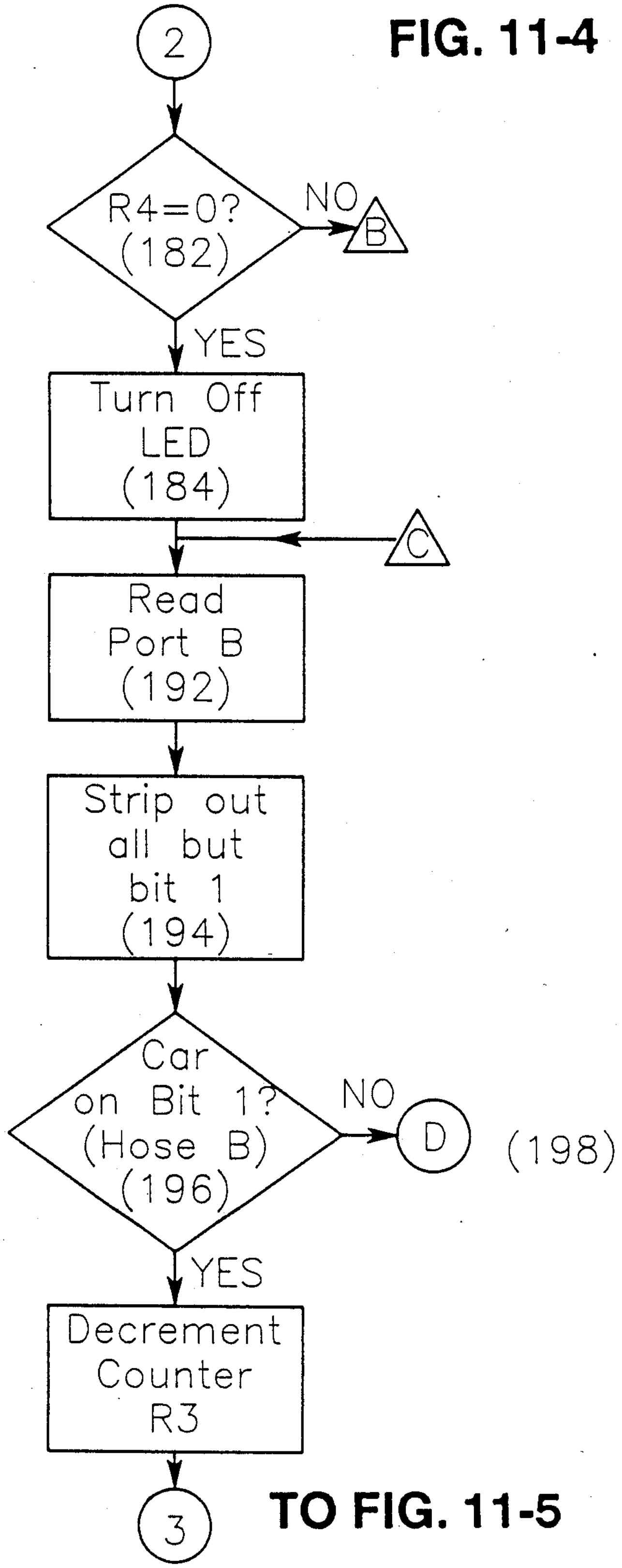
Figures 5, 11:
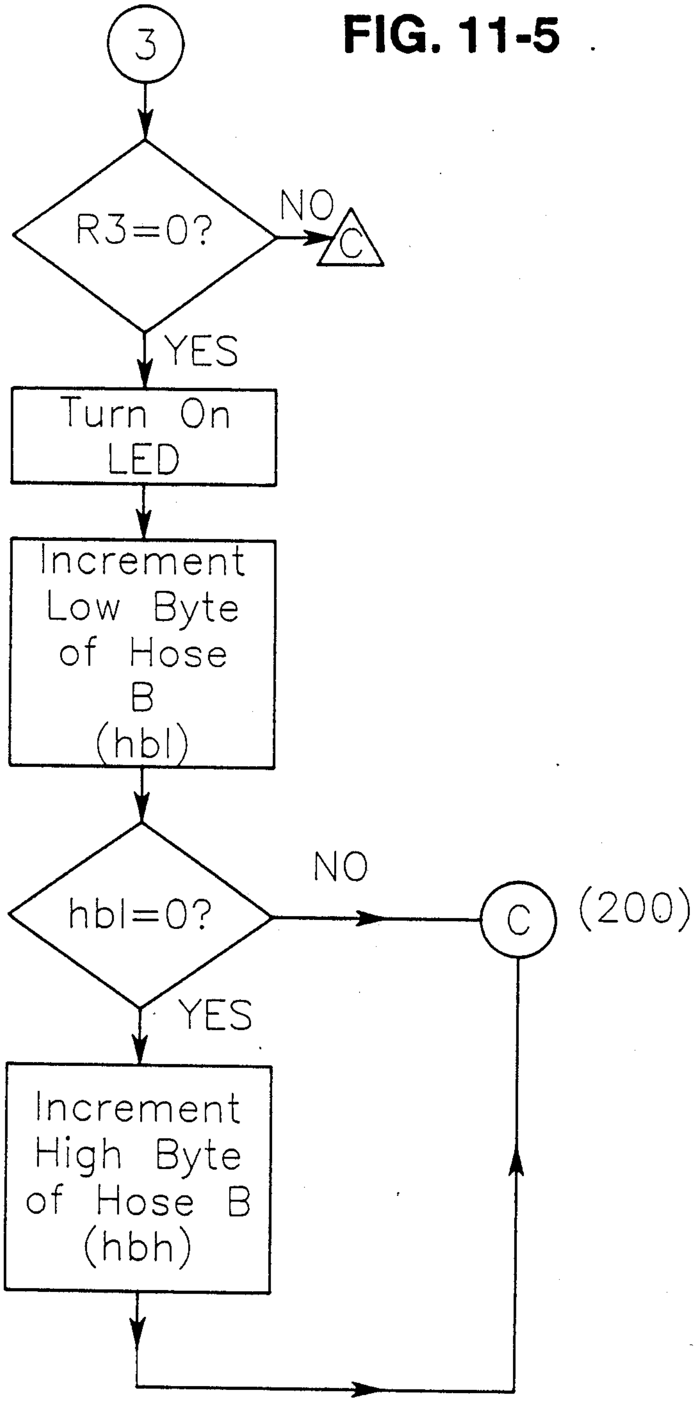
Figures 6, 11:
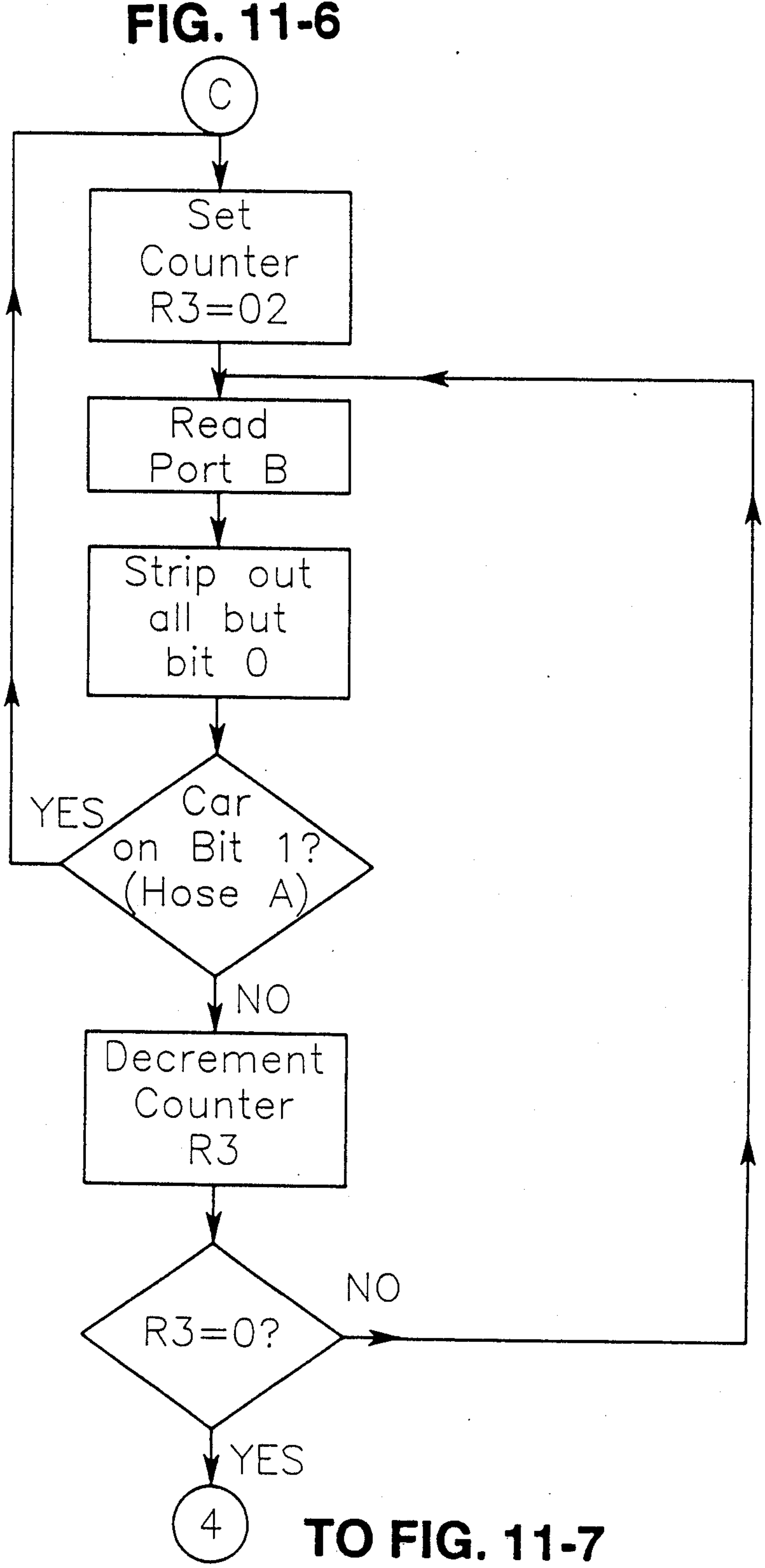
Figures 7, 11:
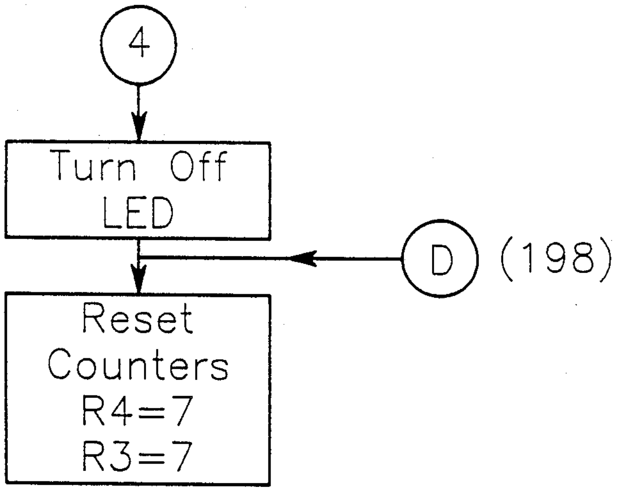

The following is a detailed discussion of the count routine 138, mentioned above, which proceeds with reference to FIG. 11-1. Due to the capability of the unit to accommodate multiple inputs, the following discussion covers a dual input situation. All other inputs would be processed in a similar manner. The following table defines the abbreviations used in FIG. 11:

R4 - Counter for Debouncing front & tail end of input
R3 - Counter for Debouncing front & tail end of input
hal - Low byte of channel A counts
hah - High byte of channel A counts
hbl - Low byte of channel B counts
hbh - High byte of channel B counts The count routine is entered at step 150 in FIG. 11-1. For channel A, step 150 initializes variables then step 152 reads port B. Step 154 strips out all bits but bit 0. Step 156 tests whether bit 0 is high or low, i.e., is there an occurrence on channel A (bit 0 low)? If yes, step 158 decrements a counter for debouncing the front end of the input signal. If, in step 160 (FIG. 11-2), this routine is satisfied with a zero (0), step 162 turns on LED 30; if not, it begins the routine over by again reading port B.

After LED 30 has been turned on, step 164 increments the low byte of channel A occurrences. Step 166 queries: Does this equal zero? If yes, step 168 increments the high byte of channel A occurrences, then begins new routine 170. In the new routine, FIG. 11-3, step 172 sets a counter for debouncing the tail end of the input signal. If the low byte of channel A occurrences does not equal zero, step 168 is bypassed and the routine proceeds directly to routine 170 to set the counter for debouncing the tail end of the input signal. Step 174 reads port B and step 176 strips out all but bit zero (0). This routine then queries whether Bit 0 = 0 (step 176). If such occurrence is noted on port B, a zero voltage is seen, and starts the sequence of steps 172–178 over by resetting the counter for debouncing the tail end of the input. Once an occurrence is no longer detected, bit 0 will equal 1. Then, step 180 decrements the counter for debouncing the tail end of the occurrence. Next, step 183 (FIG. 11-4) queries: Does bit 0 still equal 1? If yes, step 184 reads port B and starts the sequence of steps 174–182 again.

When bit equals 0, step 184 turns the LED off and goes directly to read port B (step 192), strip out all but bit 1 (step 194) and test to see if bit 1 equals 0 (step 196). This routine is identical in form to that previously described in FIG. 11 A. The exception is that this routine reads the data for occurrences on channel B by looking at bit 1 of port B.

Office Operation of Traffic Recorder

The following section describes the process by which unit 10 communicates with the computer 60. The traffic recorder microprocessor enters this process, shown in FIG. 12, from step 122 in the routine of FIG. 11 when the traffic recorder 10 is connected as shown in FIG. 5. The computer 60, meanwhile, enters this process via a PC routine. The PC routine is shown generally in FIG. 8, in greater detail in FIGS. 9A through 9K, and portions of the source code are contained in Appendices A and B.

Referring to FIG. 8, the PC will initiate serial connection at 4800 baud and field unit will send current Date and Time.

The following information will be entered through the PC software:

1. Direction Hose A
2. Direction Hose B
3. Calculated difference between A and B
4. Direction of count C Data is transferred from field unit, manipulated and stored into a file on disk.

There are various subroutines in this process that are called many times during the communication process. Rather than reiterate the same routine many times, it will be given a name, described once, then referred to by name when used in another step of the process.

Referring to FIG. 8, the computer 60, or PC, begins by initiating connection with the traffic recorder microprocessor at step 200. This step uses the code of Appendix A, entitled "Procedure Connect".

Figures 1, 12:
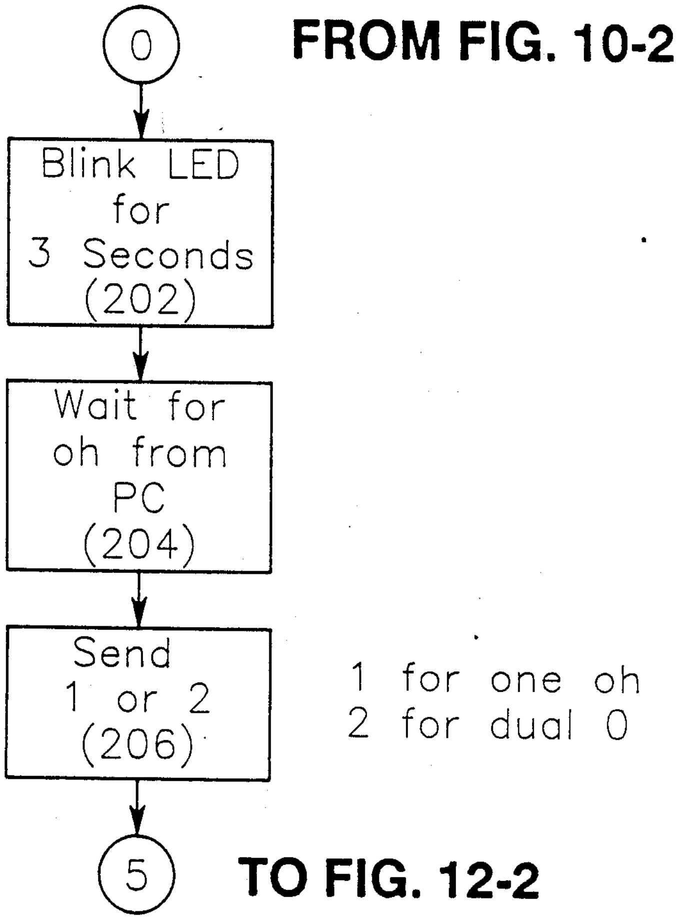
Figures 2, 12:
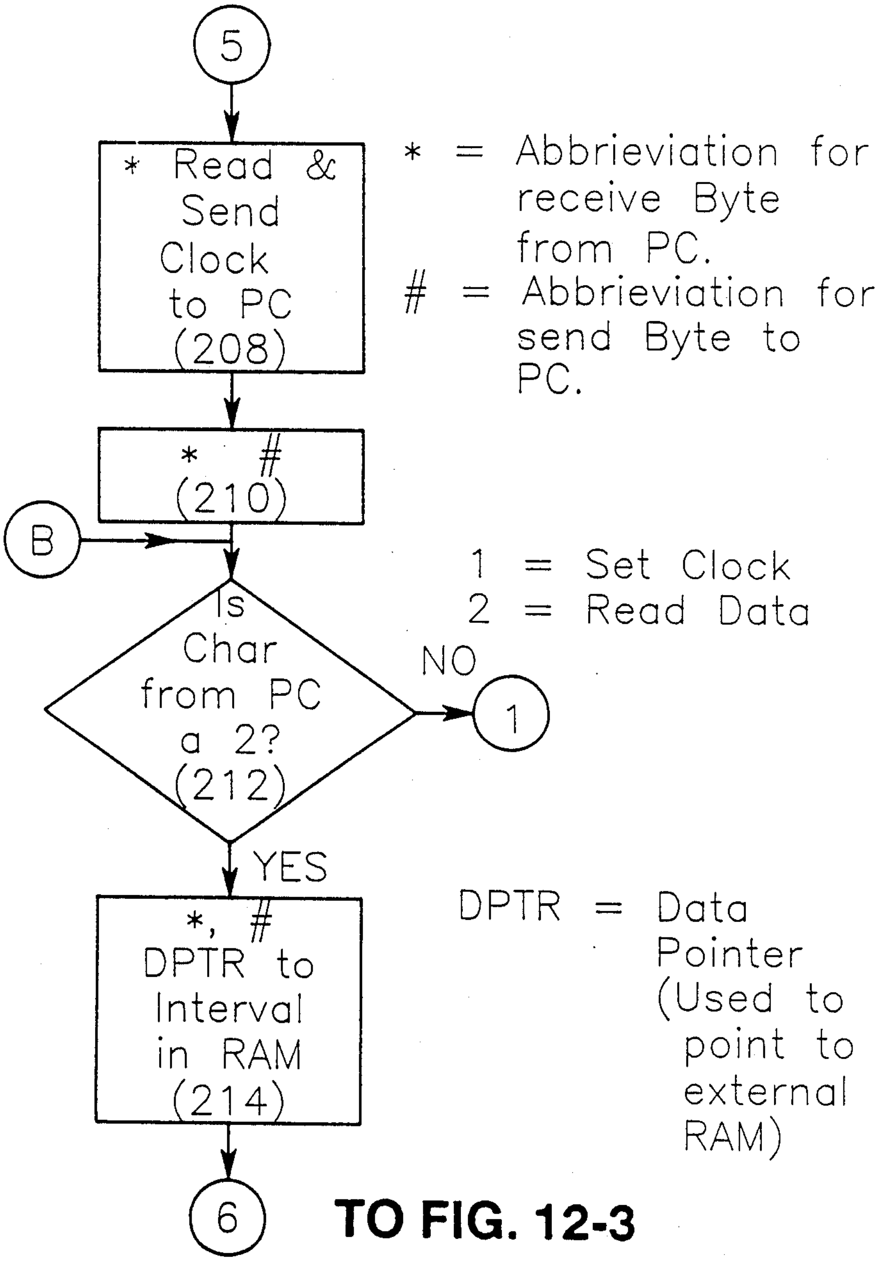
Figures 3, 12:
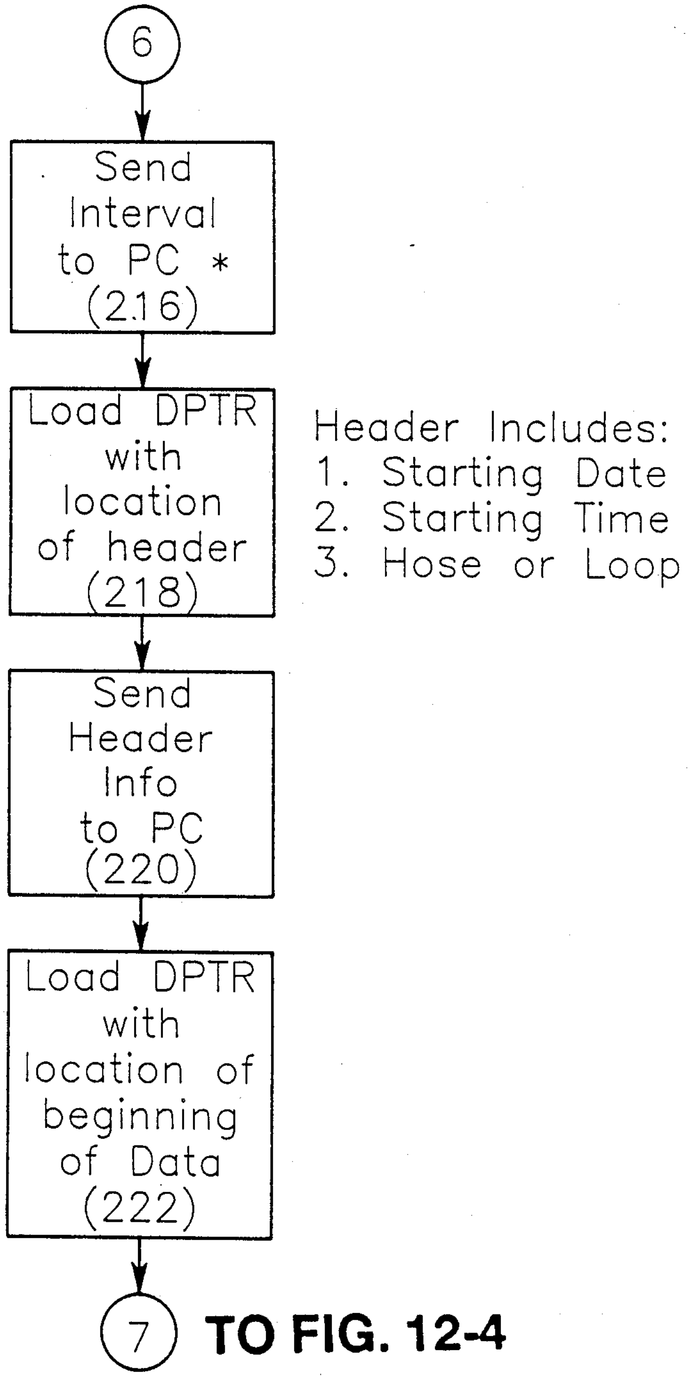
Figures 4, 12:
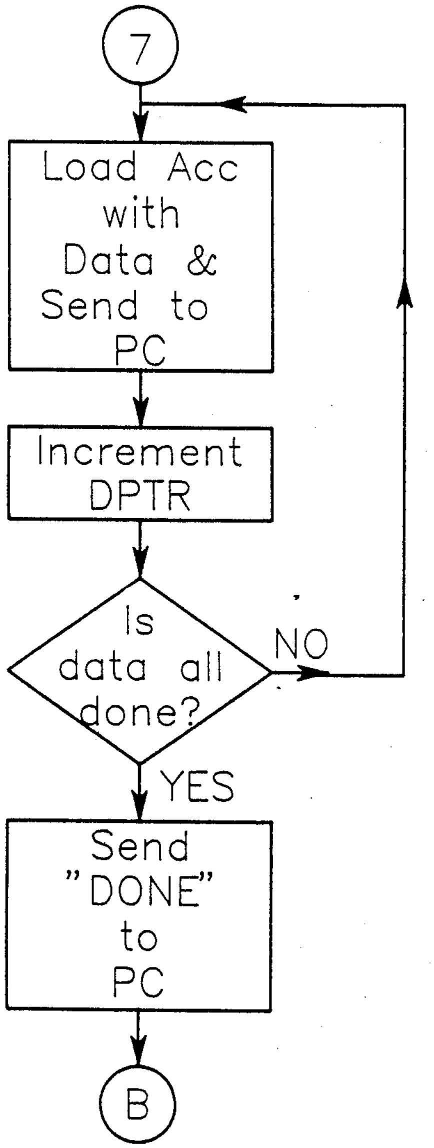

Referring to FIG. 12, the first steps for the traffic recorder microprocessor are to blink the LED 36 three times (step 202) to indicate that a connection has been made and then, in step 204, to get a character from the PC and to send a value from the microprocessor accumulator to the PC. Step 204 accesses two routines, entitled "Routine CHR-IN" (FIG. 9A) and "Routine BT_OUT" (FIG. 9B), and handshakes with the PC serial communications routine entitled "COMM.INC" contained in Appendix B, particularly Procedures "WriteCom" (lines 159–165) and "WriteCh" (lines 181–185). COMM.INC is based on a publicly available routine for serial communications known as DUMTERM (Borland International); therefore, it is not described in further detail but is provided in Appendix B to facilitate understanding of handshake communications with the traffic recorder during data unloading.

Figures 2, 9I:
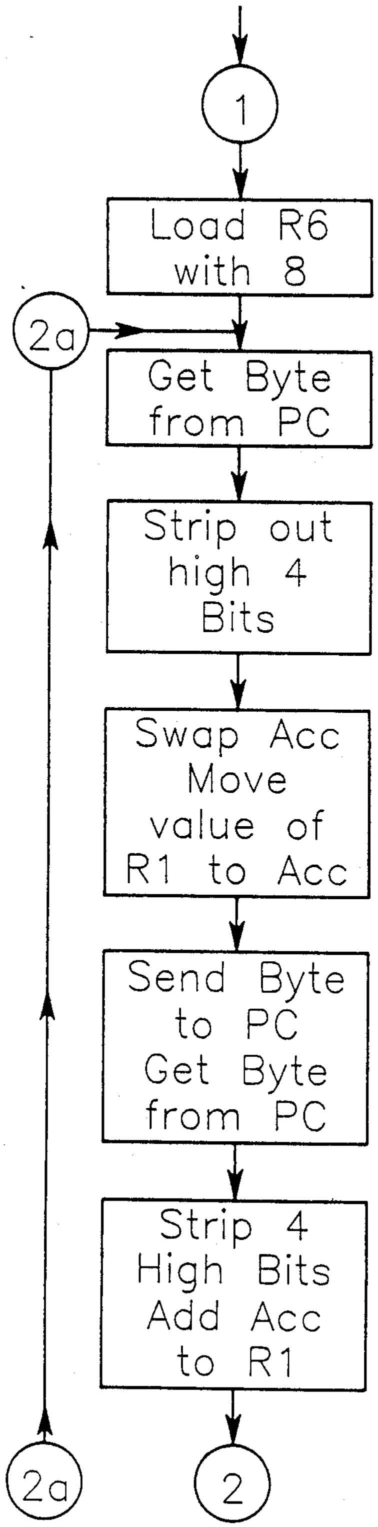
Figures 3, 9I:
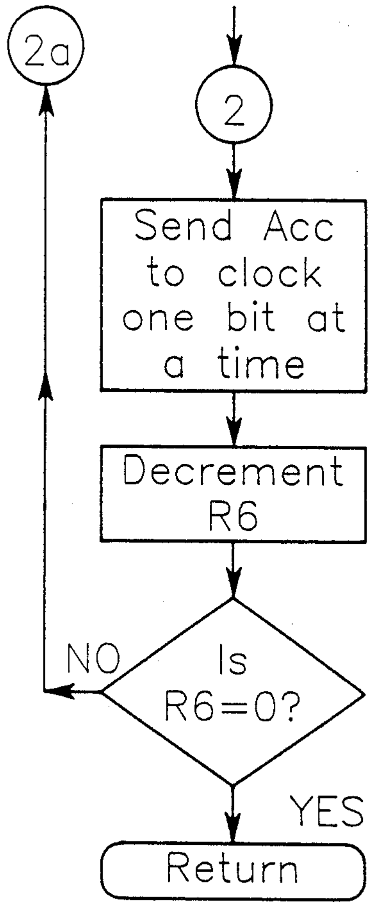
Figure 9J:
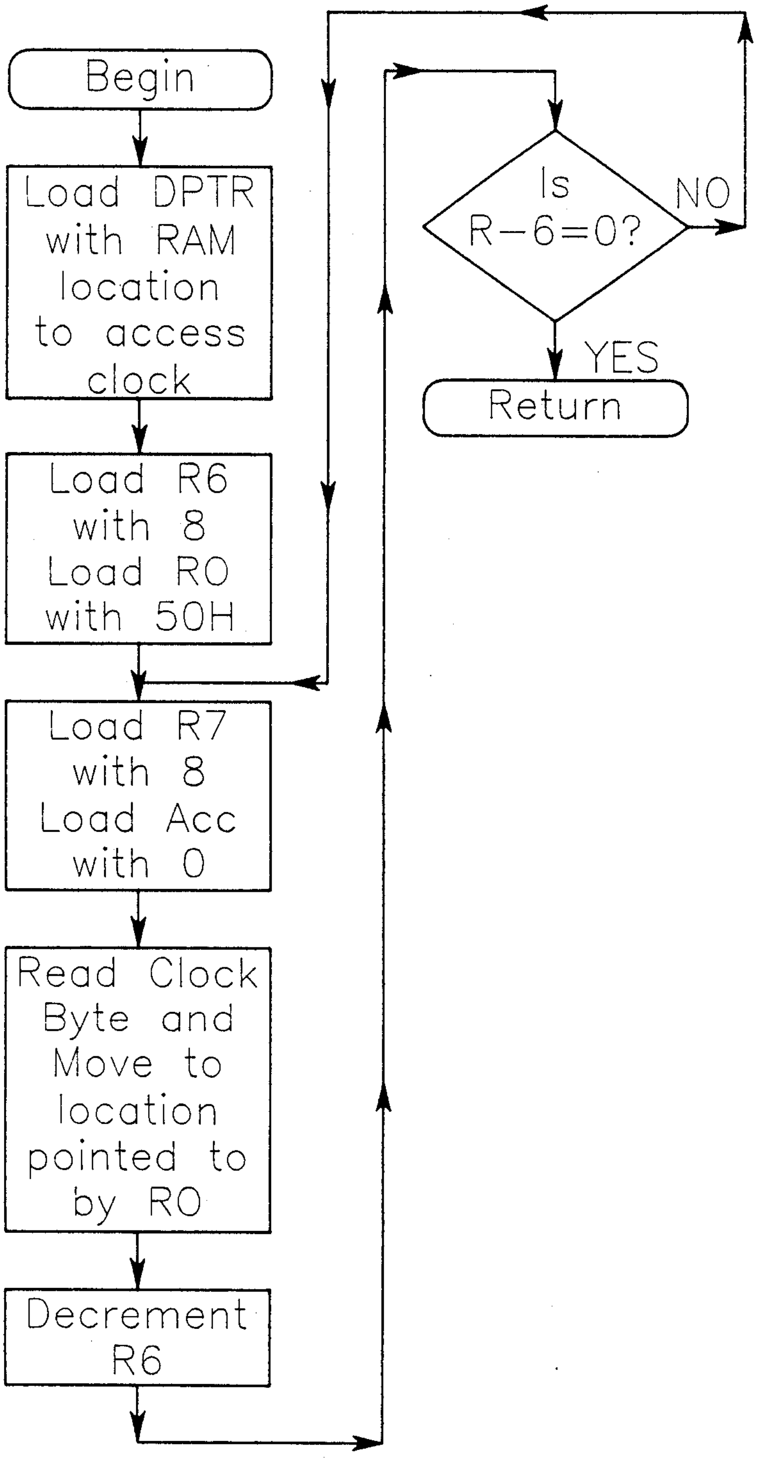
Figures 1, 9K:
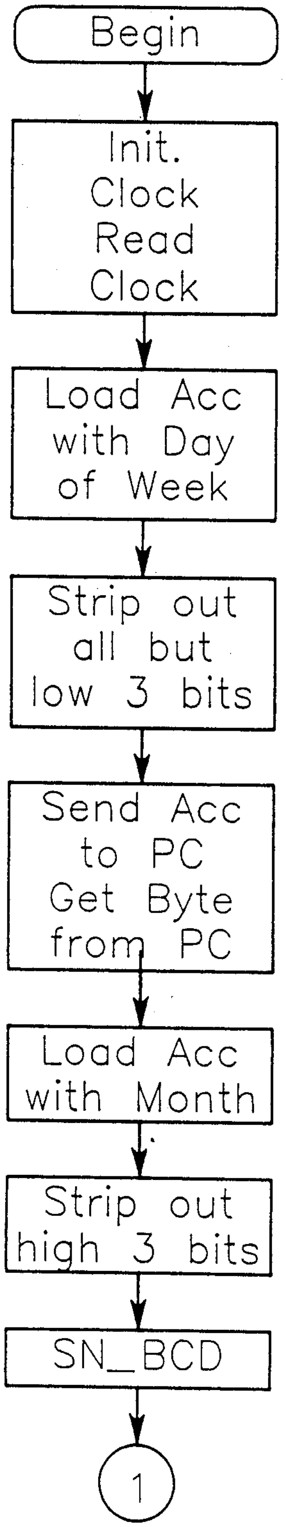
Figures 2, 9K:
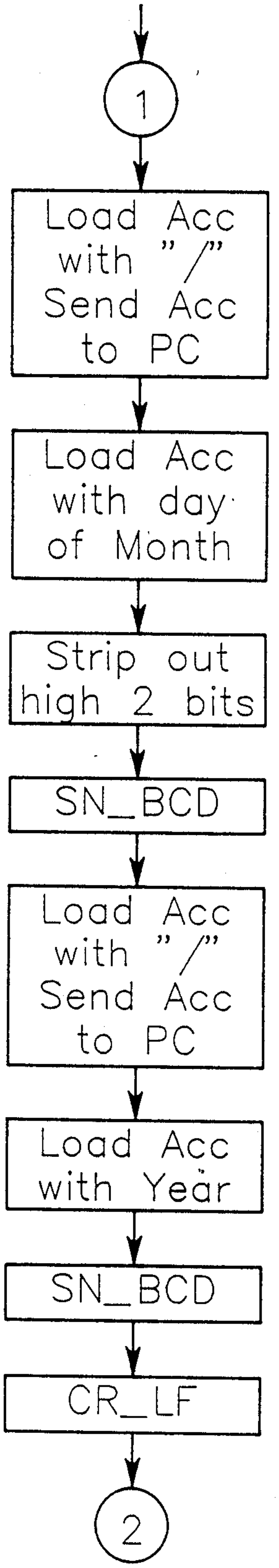
Figures 3, 9K:
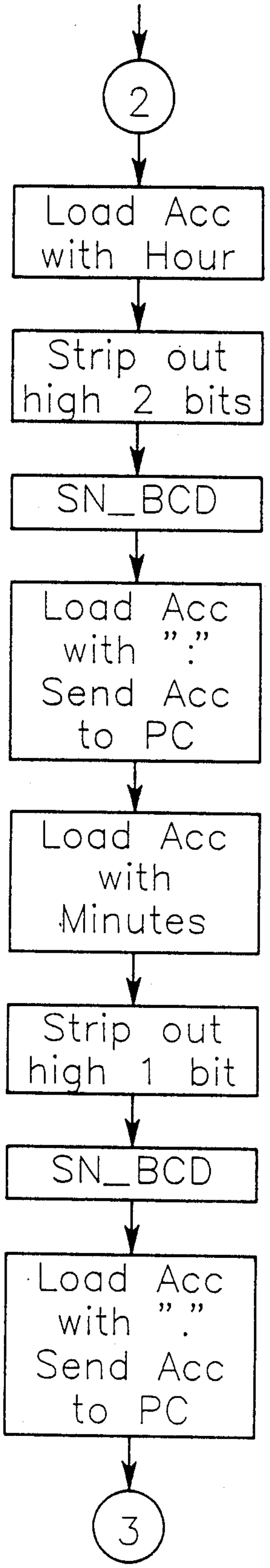
Figures 4, 9K:
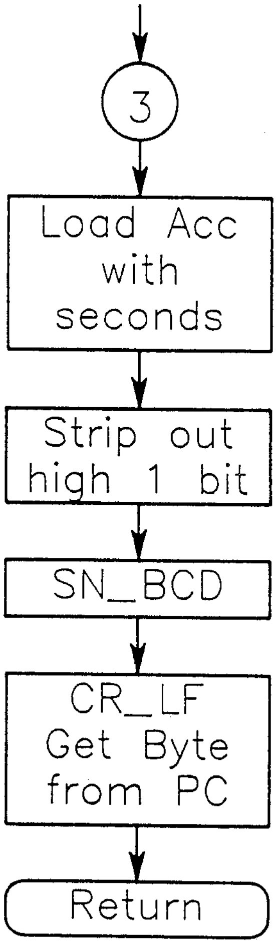

In step 206, the traffic recorder sends a number, 1 or 2, indicating whether the unit is a single channel or dual channel recorder. Next, in step 208, the traffic recorder receives another byte from the PC and responds by sending a clock reading to the PC. To perform this step, the microprocessor in the traffic recorder accesses, in turn, the routines entitled "Read Clock" (FIG. 9J) and "Send Clock to PC" (FIG. 9K). The next byte received from the PC is tested in step 212 to see if it is a 1 or a 2. If it is a 2, the program exits to a series of routines for setting the traffic recorder's real-time clock 104, entitled "Begin Clock Section" (FIG. 9G), "Routine to Initialize Clock" (FIG. 9H) and "Routine to Set Clock" (FIG. 9I).

If the character received from the PC is a 2, the software proceeds to step 214, which sets a data pointer to data stored in RAM 100. This step loads the RAM location of the initial stored interval into the data pointer. Next, step 216 moves the value of the interval into the microprocessor accumulator, gets another character from the PC and sends the value in the microprocessor accumulator to the PC. Step 218 loads the RAM location of header information for the first interval data into the data pointer. Step 220 sends the header information to the PC.

Steps 214 through 220 are shown in greater detail in FIG. 9F. During these steps, the traffic recorder software interacts with the PC software routine entitled "OVERLAY3.PAS" in Appendix C. Briefly, the routine of FIG. 9F loads the day of week into microprocessor accumulator, converts to ASCII, and sends the resultant value in the microprocessor accumulator to the PC. It then loads the accumulator with a hyphen "-" and sends this value to the PC. It increments the data pointer and loads the month into the microprocessor accumulator and sends it in the form of binary coded decimal (BCD). The subroutine for the BCD conversion is shown in FIG. 9C. After the BCD month and day date information is sent, the routine loads the microprocessor accumulator with "/" and sends this value to the PC. The data pointer is incremented to days and the day of the date is then sent in the same manner: load the microprocessor accumulator with days and send BCD; load the microprocessor accumulator with "/" and send value in the microprocessor accumulator to the PC. The data pointer is then incremented to years; the accumulator loaded with years and sent BCD. The routine then sends a carriage return and line feed (See subroutine entitled "Routine CR_LF" in FIG. 9D) and gets a character back from the PC.

The next steps are to increment the data pointer to hours; load the microprocessor accumulator with hours; and send BCD. Then the microprocessor accumulator is loaded with ":" and this value is sent to the PC. The data pointer is incremented to minutes and the foregoing procedure is repeated for the stored minutes data. The next steps are to load the microprocessor accumulator, successively, with ASCII "0", #,# and send these to the PC, followed by a carriage return and line feed.

The data pointer is then loaded with the location where the hose/loop identity is stored and moved to the microprocessor accumulator. The routine sends the value in the microprocessor accumulator to the PC (Procedure Get Hose A in Appendix C) and gets a character from the PC. It then loads the data pointer with the value of the starting location of RAM, where data is stored, and moves the value into the microprocessor accumulator. The routine then queries: Is the microprocessor accumulator equal to 255? If "no," it sends the count to the PC. The subroutine for "sending counts" shown in FIG. 9E, proceeds as follows: Load register B with 100. Divide microprocessor accumulator by B, convert to ASCII, send value in the microprocessor accumulator to the PC, and get character from PC. Move B to A, load B with 10. (When dividing, the remainder goes into B.) Divide A by B, convert to ASCII, send value in the microprocessor accumulator to the PC and get character from the PC. Move B to A, convert to ASCII, send value in the microprocessor accumulator to the PC, and get back a character. This ends the subroutine and control returns to FIG. 9F, column 3.

It increments the data pointer to the high byte of the count; moves the value to the microprocessor accumulator and then sends another count. It again increments the data pointer to next count; moves the value into microprocessor accumulator; and checks again to see if the pointer value equals 255. If "no," the routine repeats the steps described above. If "yes," it sends the count; increments the data pointer to the high byte; and moves the value into the microprocessor accumulator. It again queries; Is high byte 255? If "no", it sends the count and starts the process over beginning with "move value into the microprocessor accumulator" which is located 20 lines above. If "yes", the routine sends the count and ends the routine.

Essentially the same procedure is followed to unload traffic data recorded for two transducers. In this case, however, the PC operates under control of the routine OVRLAY4A.PAS. This routine is similar to OVRLAY3.PAS but for two detectors and, additionally, provides a capability for the user selectably to store data for the sum or difference between the two detector counts for each time interval, as well as the individual counts.

Setting Traffic Recorder Real Time Clock

The clock routine (FIG. 9G) is described as follows: Get a character from the PC, send value to the microprocessor accumulator register to the PC and initialize the real time clock. The "initialize clock" subroutine (FIG. 9H) is accomplished as follows: Load the data pointer with RAM location to access clock. Read value at RAM location sixty-six (66) times, send special code to initialize clock one bit at a time. (The special code follows: C5H, 3AH, AEH, 5CH, C5H, 3AH, A3H and 5CH). End of subroutine. To set Dallas clock 103, the routine in FIG. 9G gets a character from the PC and sends a value in the microprocessor accumulator register for the RAM location to access the clock to the PC. It then reads the clock (subroutine in FIG. 9J); sends the reading to the PC (subroutine in FIG. 9K). When the clock reading appears on the PC display, the user can choose between reading data or setting the traffic counter's clock. In setting the clock, the following routine (FIG. 9I) is completed:

1. Load data pointer with RAM location to access clock.

2. Move register 6 to register 8.

3. Get character from PC and strip out high four (4) bits.

4. Swap 0000 11011 with 11011 0000, move register 1 to A, send value in the microprocessor accumulator register to the PC and get a character from the PC.

5. Strip out high four bits and add microprocessor accumulator register to register 1.

6. Send the microprocessor accumulator register to RAM bit by bit and send value in the microprocessor accumulator register to the PC.

7. Decrement register six (6).

8. If register six (6) does not equal zero, go back up to get character from PC immediately following the move register six (6) to register eight (8) and proceed with stated steps.

9. If register six (6) equals 0, end of routine.

To read the Dallas clock, execute the following instructions (FIG. 9J):

1. Load the data pointer with RAM location to access clock.

2. Load register six (6) with eight (8), load register zero (0) with 50H.

3. Load register seven (7) with eight (8) and load microprocessor and accumulator register with 0. 4. Read clock byte and move to location register 0.

5. Decrement register six (6).

6. If register six (6) does not equal 0, go back to load register seven (7) with eight (8) and execute subsequent steps.

7. If register six (6) equals 0, end of routine.

The Send clock to PC routine (FIG. 9K) follows:

1. Initialize and read clock.

2. Load the microprocessor accumulator register with day of week.

3. Strip out all but low three (3) bits, send value in microprocessor accumulator register to the PC and get character from PC.

4. Load microprocessor accumulator register with month.

5. Strip out high three (3) bits and send BCD.

6. Load microprocessor accumulator register with "/" and send value in microprocessor accumulator register to PC.

7. Load microprocessor accumulator register with day of month.

8. Strip out high two (2) bits send BCD

9. Load microprocessor accumulator register with "/", send value of microprocessor accumulator register to PC.

10. Load microprocessor accumulator register with year and send BCD.

11. Carriage return/line feed and get character from PC.

12. Load microprocessor accumulator register with hour.

13. Strip out high two (2) bits and send BCD.

14. Load microprocessor accumulator register with ":" and send value of microprocessor accumulator register to PC.

15. Load microprocessor accumulator register with minutes.

16. Strip out high bit and send BCD.

17. Load microprocessor accumulator register with "." and send value in microprocessor accumulator register to PC.

18. Load microprocessor accumulator register with seconds.

19. Strip out high bit and send BCD.

20. Carriage/line feed and get character from PC. End of "send clock to PC" routine.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

Appendix A

```
    03-06-87 21:59:34  PROCEED.INC
Tue 05-12-87 21:06:45                    Connect


>
      Procedure Connect;
       Label Display_Time_Date;
         begin

      {Initialize comm port}
        segment:=dseg;                    {segment is an absolute variable used
         by }
                                          {the interrupt routine to restore the
                                           Ds }
                                          {register to point to the DSEG
                                            }
        case comm of
             1: comp:=com1;
             2: comp:=com2;
        end;
        IntOn(comp);                      {Set up the interrupt routine
          }
        Border(1,1,15,15,14,'C O N N E C T I O N   M E N U');bf(0,15,3);
          for i:=8 to 10 do begin
                 gotoxy(32,i);write('                 ');
```

```
      end;
      for i:=13 to 19 do begin
              gotoxy(32,i);write('                  ');
       end;
       row:=8;col:=32;str1:='IMMMMMMMMMMMMMMM;';fast(str1,row,col);
       row:=9;col:=32;str1:=':                :';fast(str1,row,col);
      row:=10;col:=32;str1:='HMMMMMMMMMMMMMMMM<';fast(str1,row,col);
      row:=13;col:=32;str1:='IMMMMMMMMMMMMMMM;';fast(str1,row,col);
      for i:=14 to 15 do begin
           row:=i;col:=32;str1:=':';fast(str1,row,col);
           col:=48;str1:=':';fast(str1,row,col);
      end;
     row:=16;col:=32;str1:='GDDDDDDDDDDDDDD6';fast(str1,row,col);
     for i:=17 to 18 do begin
          row:=i;col:=32;str1:=':';fast(str1,row,col);
          col:=48;str1:=':';fast(str1,row,col);
     end;
     row:=19;col:=32;str1:='HMMMMMMMMMMMMMMMM<';fast(str1,row,col);
      bf(1,15,3);
     gotoxy(36,14);write('MC DATE');
     gotoxy(36,17);write('MC TIME');bf(1,15,3);
     gotoxy(8,22);
     write('Move the switch on the MICROCOUNTS counter to the BEGIN
      position');
     gotoxy(14,23);write('When the LED begins to blink depress the
      RETURN key');
     gotoxy(38,24); write('or');
     Esc_Exit; ch:=chr(0);
     repeat
        read(kbd,ch);
        if ch in [chr(13),chr(27)] then begin
          Case ord(ch) of
             27: if keypressed then write(chr(7));
          end;
        end
        else begin
           write(chr(7));
        end;
     until ((ch=chr(13)) or ((ch=chr(27)) and (not keypressed)));
     if ch=chr(27) then Goodbye;
     bf(1,15,2);bottom;

    ch:=' ';                          {Intialize ch for the loop
      }
    i:=0;
    repeat
      while not ModemInput do  begin
         kch:='B';
         WriteCom(kch);
         delay(75); i:=i+1;
         if i>100 then begin
             Intoff;  {Restore enviorment}
             Cursor_On; GraphBackground (0);
             bf(0,15,3); clrscr;
             writeln('I can not wait forever for a connection!');
             Connection_Made:=False; halt;
         end;
      end;
      ch:=ReadCom;
    until ((ch='1') or (ch='2')); val(ch,hose_count,i);

  Display_Time_Date:
    bf(0,31,4);gotoxy(33,9);write('CONNECTION MADE');bf(0,14,3);gotoxy(
     34,15);
```

```
   Writech;                        {write to say ok for day of week}
   Readch;                                 {Read day of week}
   gotoxy(35,15);write(copy(day[ord(ch)],1,3),'-');  {write day of week
    to screen}

   Writech;                        {write to say ok to receive date}
   repeat
      Readch;
      write(ch);
   until ch=chr(10);
   Writech;                        {write to say ok to receive time}
   gotoxy(36,18);
   repeat
      Readch;
      write(ch);
   until ch=chr(10);                    {write I board time};
   bf(1,15,2);bottom;bf(1,15,3);
   gotoxy(28,24);write('Depress RETURN to continue');Ret;
end; {End Procedure Connect}

>
```

Appendix B

IntHandler

```

Procedure IntHandler;
   Begin
       inline( $50           {push ax       }
               /$53          {push bx       }
               /$51          {push cx       }
               /$52          {push dx       }
               /$57          {push di       }
               /$56          {push si       }
               /$06          {push es       }
               /$1E          {push ds       }
               /$2E          {cs:           }
               /$A1  /$A0 /$00{mov ax, [00A0]}
               /$50          {push ax       }
               /$1F          {pop ds        }  );
       tbyte:=port[comport];             {Get the char in the port}
       lbyte:=port[comport+linestat];    {Get status of the port  }
       if (head<buffsize) then           {Check bounds of the ring}
           head:=head+1                  {buffer, and if smaller  }
       else                              {then increment by one   }
          head:=0;                       {otherwise set to the    }
                                         {first element           }
      intbuffer[head].o:=tbyte;          {Load the buffer w/ the  }
                                         {character               }
      port[$20]:=$20;                    {Enable all other        }
                                         {interrupts except       }
                                         {calling INT (0C)        }
      inline( $1F          {pop ds  }
              /$07         {pop es  }
              /$5E         {pop si  }
              /$5F         {pop di  }
              /$5A         {pop dx  }
              /$59         {pop cx  }  {Restore all registers }
              /$5B         {pop bx  }
              /$58         {pop ax  }
              /$5D         {pop bp  }  {Reset the stack to its}
              /$89  /$EC   {mov  sp,bp}{proper position       }
              /$5D         {pop bp  }
              /$CF );      {iret    }  {Return                }
   end; {End Procedure Inthandler}

```

```
Procedure SetRate(r:ratetype);
  Var
    tlcr,                                   {Line Control Register
      }
    tdlmsb,                                 {Divisor latch MSB
      }
    tdllsb  :byte;                          {Divisor latch LSB
      }

  Begin
    tdlmsb:=0;                              {Set DL MSB to 0 for 1200
     baud  }
                                            {4800 and 9600 baud
                                                }
    case r of                               {Use case to check baud rate
      }
       rate300:  begin                      {Check for 300 baud
          }
                    tdlmsb:=1;              {Set DL MSB to 01
                        }
                    tdllsb:=$80;            {Set DL LSB to 80
                        }
                  end;                      {for a total of 0180
                      }
       rate1200: tdllsb:=$60;               {1200 set LSB to 60
          }
       rate4800: tdllsb:=$18;               {4800 set LSB to 18
          }
       rate9600: tdllsb:=$0C;               {0C for 9600 baud
          }
    end;
    tlcr:=port[comport+linectrl];           {Get the line control
     register  }
    port[comport+linectrl]:=tlcr or $80;    {Set divisor latch access
     bit in}
                                            {order to access divisor
                                             latches}
    port[comport]:=tdllsb;                  {then store the values for
     the  }
    port[comport+1]:=tdlmsb;                {desired baud rate
      }
    port[comport+linectrl]:=tlcr and $7f;   {Then clear the DLAB in
     order   }
                                            {to access the receiver
                                             buffer  }
 End; {End Procedure SetRate}

Procedure IntOn(com:comtype);
   Const
     bits5=0;
     bits6=1;
     bits7=2;                      {These are constants used to define
      parity,}
     bits8=3;                      {stop bits, data bits, etc.
         }
     stopbit1=0;
     stopbit2=4;
     noparity=0;
     evenparity=16;
     dtrtrue=1;
     rtstrue=2;
     bit3true=8;
   Var
     tbyte: byte;                   {Temporary byte buffer}
     i:     integer;                {counter              }
   begin
     head:=0;                       {Intialize the ring   }
     tail:=0;                       {buffer indexes       }
     case com of
```

```
        com1: comport:=com1base;  {Set the com port to  }
        com2: comport:=com2base;  {talk to              }
      end;
      tbyte:=port[comport];               {Read the ports to clear of    }
      tbyte:=port[comport+linestat];      {any error conditions          }
      SetRate(rate4800);                              {Get the baud rate
         }
      port[comport+linectrl]:=bits7+stopbit1+noparity;     {Set the
       protocall}
      port[comport+modemctrl]:=dtrtrue+rtstrue+bit3true;   {Enable com
       port  }
      port[comport+intenreg]:=1;                           {interupts
          }
      tbyte:=port[$21];
      with registers do
       begin
         ax:=$2500;                {Load the function number for
          redefining an}
                                   {interrupt
                                             }
         ds:=cseg;                 {Get and set the segment
            }
         dx:=ofs(Inthandler);      {and offset of the handler
            }
       end;
       case com of
         com1: begin
                 oldvecoff:=memw[0000:irq4];     {Save the segment and
                  offset }
                 oldvecseg:=memw[0000:irq4+2];   {offset of the Dos
                  interrupt }
                                                 {handler
                                                      }
                 registers.ax:=registers.ax+$0c; {Use the Com1:
                  interrupt     }
                 intr($21,registers);            {Call Dos to reset
                       }
                 port[$21]:=tbyte and $ef;       {Int 0C
                       }
               end;
        com2: begin
                oldvecoff:=memw[0000:irq3];      {Same as above
                      }
                oldvecseg:=memw[0000:irq3+2];
                registers.ax:=registers.ax+$0b;
                intr($21,registers);
                port[$21]:=tbyte and $f7;
              end;
       end;
       inline($fb);                                  {Enable interrupts
          }
   end; {End Procedure IntOn}

 Procedure IntOff;
   Var
     tbyte:   byte;
   Begin
     inline($FA); {CLI}                    {Disable interrupts
        }
     tbyte:=port[$21];
     port[comport+intenreg]:=0;            {Disable Com interrupts
        }
     if comport=$3f8 then                  {If using Com1: then
        }
       begin
         port[$21]:=tbyte or $10;          {Restore the Dos
            }
```

```
        memw[0000:irq4]:=oldvecoff;      {interrupt handler
           }
        memw[0000:irq4+2]:=oldvecseg;
      end
      else
        begin
          memw[0000:irq3]:=oldvecoff;      {Restore the Dos
             }
          memw[0000:irq3+2]:=oldvecseg;    {interrupt handler
             }
          port[$21]:=tbyte or $08;
        end;
    end;  {End Procedure IntOff}

Function ReadCom: char;
  Begin
    if (head<>tail) then                  {Check for ring buffer   }
      begin                               {character               }
        if (tail<>buffsize) then          {Check the limits of     }
          tail:=tail+1                    {the ring and set tail   }
        else                              {accordingly             }
          tail:=0;
        ReadCom:=intbuffer[tail].c;       {Get the character       }
      end;
    end;

Procedure WriteCom(ch: char);
  Var
    tbyte:   byte;
  Begin
    tbyte:=ord(ch);                {Change to byte format    }
    port[comport]:=tbyte;          {Output the character     }
  End; {End Procedure WriteCom}

Function ModemInput: boolean;
  begin
    ModemInput:=(head<>tail);
  end;

Procedure ReadCh;
  begin
    repeat               {Routine to wait until something in ring
     buffer}
      begin
      end;
    until ModemInput;
        ch:=ReadCom;           {it is read in and printed to the        }
  end;  {End Procedure Readch}

Procedure WriteCh;
   begin
        kch:='A';
        WriteCom(kch);         {Writes character to the com port        }
   end; {End Procedure WriteCh}

 Procedure ReadCh_Delay;
   Var
     i:   integer;
   begin
     for i:=1 to 10 do begin
       if ModemInput then begin
          ch:=ReadCom; Exit;
       end;
       delay(100);
     end;
   end; {End ReadCh_Delay}
```

Appendix C

OVRLAY3.PAS

Get_Hose_A

```
Procedure Get_Hose_A;
   begin
      lb:=0;          {zero out low byte }
      Readch;         {Read hundreds for low byte}
      lb:=(ord(ch)-48)*100;
      Writech;
      Readch;         {Read tens for low byte}
      lb:=lb+((ord(ch)-48)*10);
      Writech;
      Readch;         {Read units for low byte}
      lb:=lb+(ord(ch)-48);
      hb:=0;         {zero out high byte}
      Writech;
      Readch;        {Read  hundreds for high byte}
      if ch in ['0'..'9'] then begin     {Checks to see if DNE is sent}
          hb:=(ord(ch)-48)*100;
          Writech;
          Readch;    {Read tens for high byte}
          hb:=hb+((ord(ch)-48)*10);
          Writech;
          Readch;    {Read units for high byte}
          Writech;
          hb:=hb+(ord(ch)-48);
          tmp:=trunc(((hb*256)+lb)/hose_or_loop);
       end {End if ch in [0..9]}
       else begin
          Writech;
          Readch;
          Writech;
          Readch;
          Writech;
          Data_All_Done:=True;
          exit;
       end; {End if DNE was sent}


   end; {End Procedure Get Hose A}

{Initialize comm port}
  segment:=dseg;                   {segment is an absolute variable used
   by }
                                   {the interrupt routine to restore the
                                    Ds }
                                   {register to point to the DSEG
                                     }
  case comm of
       1: comp:=com1;
       2: comp:=com2;
  end;
  IntOn(comp);                     {Set up the interrupt routine
    }
  ch:=' ';                         {Intialize ch for the loop
    }
  repeat
    while not ModemInput do begin
      kch:='B';
      WriteCom(kch);
      delay(75);
    end;
    ch:=ReadCom;
 until ch='B';
 Writech;                         {write to say ok for day of week}
```

```
  Readch; interval:=ord(ch); writeln(FilVar,'Interval: ',ord(ch));

{Write Day of Week and Starting Date into File}

   Writech;
   write(FilVar,'Starting Date: ');  {Day of Week}
   repeat
     ReadCh;
     Write(FilVar,ch);
   until ord(ch)=10;

 {Write Starting Time into File}
   Writech;
   write(FilVar,'Starting Time: ');
   repeat
     ReadCh;
     Write(FilVar,ch);
   until ord(ch)=10;

   Writech; Readch; hose_or_loop:=ord(ch);

   bf(1,15,3); gotoxy(20,17); write('Read         Intervals');
    bf(1,14,3);

{This section reads count data into File}
   x:=0;
   First_Half:=False;

   Writech;        {Tell I board to start sending count data}
More_Data_Ram:
   Get_Hose_A;
   if Data_All_Done=True then goto Data_Transfer_Done;
   if interval=24 then begin
      VolA::=tmp;
      Get_Hose_A;
      if Data_All_Done=True then goto Data_Transfer_Done;
      VolA::=VolA+tmp;
   end
   else begin
      VolA::=tmp;
   end;
   Writeln(FilVar,VolA:12:0);
   x:=x+1;
   if ((x mod 5=0) or (x=1)) then begin
      gotoxy(27,17); write(x:5);
   end;
   goto More_Data_Ram;

 Data_Transfer_Done:

   no_intervals:=x;   {Number of intervals recorded}
   writeln(FilVar,chr(26));

   Close(FilVar);

   Intoff;  {Restore enviorment}

>

Procedure Get_Hose_Data;
  begin
    lb::=0;            {zero out low byte }
    Readch;            {Read hundreds for low byte}
    lb:=(ord(ch)-48)*100;
    Writech;
    Readch;            {Read tens for low byte}
    lb:=lb+((ord(ch)-48)*10);
    Writech;
    Readch;            {Read units for low byte}
```

```
      lb:=lb+(ord(ch)-48);
      hb:=0;          {zero out high byte}
      Writech;
      Readch;         {Read  hundreds for high byte}
      if ch in ['0'..'9'] then begin     {Checks to see if DNE is sent}
          hb:=(ord(ch)-48)*100;
          Writech;
          Readch;    {Read tens for high byte}
          hb:=hb+((ord(ch)-48)*10);
          Writech;
          Readch;    {Read units for high byte}
          Writech;
          hb:=hb+(ord(ch)-48);
          tmp:=trunc(((hb*256)+lb)/hose_or_loop);
        end {End if ch in [0..9]}
        else begin
          Writech;
          Readch;
          Writech;
          Readch;
          Writech;
          Data_All_Done:=True;
          exit;
        end; {End if DNE was sent}
    end; {End Procedure Get Hose Data}


>
Intoff;                          {Restore the enviroment                }

if receive_data_choice=2 then
  temp:=data_drive
else
  temp:=d_drive;
l:=length(temp);
if copy(temp,l,1)<>'\' then
  temp:=temp+'\temp.dai'
else
  temp:=temp+'temp.dai';
Assign(Filvar,temp);
Append(FilVar);

if receive_data_choice=2 then file_name:=temp;

{Initialize comm port}
  segment:=dseg;               {segment is an absolute variable used
    by }
                               {the interrupt routine to restore the
                                Ds }
                               {register to point to the DSEG
                                 }
  case comm of
       1: comp:=com1;
       2: comp:=com2;
  end;
  IntOn(comp);                 {Set up the interrupt routine
    }
  ch:=' ';                     {Intialize ch for the loop
    }
  repeat
    while not ModemInput do begin
      kch:='8';
      WriteCom(kch);
      delay(75);
    end;
    ch:=ReadCom;
  until ch='8';
  Writech;                     {write to say ok for day of week}

```

```
  Readch; interval:=ord(ch); writeln(FilVar,'Interval: ',ord(ch));

{Write Day of Week and Starting Date into File}

   Writech;
   write(FilVar,'Starting Date: ');  {Day of Week}
   repeat
     ReadCh;
     Write(FilVar,ch);
   until ord(ch)=10;

 {Write Starting Time into File}
   Writech;
   write(FilVar,'Starting Time: ');
   repeat
     ReadCh;
     Write(FilVar,ch);
   until ord(ch)=10;

   Writech; Readch; hose_or_loop:=ord(ch);


   bf(1,15,3); gotoxy(20,17); write('Read         Intervals');
    bf(1,14,3);

{This section reads count data into File}
   x:=0;
   First_Half:=False;

   Writech;       {Tell I board to start sending count data}

   Data_All_Done:=False;
More_Data_Ram:
   Get_Hose_Data;
   if Data_All_Done=True then goto Data_Transfer_Done;
   if interval=24 then begin
      VolA:=tmp;
      Get_Hose_Data;
      if Data_All_Done=True then goto Data_Transfer_Done;
      VolB:=tmp;
   end
   else begin
      VolA:=tmp;
   end;
   Hr24_part_1:=0;

   Get_Hose_Data;
   if Data_All_Done=True then goto Data_Transfer_Done;
   if interval=24 then begin
      VolA:=VolA+tmp;
      Get_Hose_Data;
      if Data_All_Done=True then goto Data_Transfer_Done;
      VolB:=VolB+tmp;
   end
   else begin
      VolB:=tmp;
   end;
   x:=x+1;
   if ((x mod 5=0) or (x=1)) then begin
      gotoxy(27,17); write(x:5);
   end;


   Case hose_a_b of
      1: VolC:=VolA+VolB;
      2: begin
           if VolA>=VolB then begin
             VolC:=VolA-VolB;
           end
```

```
          else begin
            VolA:=VolB; VolC:=0;
          end;
        end;
     3: begin
          if VolB>=VolA then begin
            VolC:=VolB-VolA;
          end
          else begin
            VolB:=VolA; VolC:=0;
          end;
        end;
  end; {End Case hose_a_b of}
  Case First of
     'a': Write(FilVar, VolA:12:0);
     'b': Write(FilVar, VolB:12:0);
  end; {End case First of}
  Case Secnd of
     'b': begin
            if hose_B1='Not App' then begin
               Writeln(FilVar,' ');
            end
            else begin
               if Last<>chr(0) then
                  Write(FilVar, VolB:12:0)
               else
                  Writeln(FilVar, VolB:12:0);
            end;
          end;
     'c': begin
            if Last<>chr(0) then
              Write(FilVar, VolC:12:0)
            else
              Writeln(FilVar, VolC:12:0);
          end;
  end; {End case Secnd of}

  Case Last of
     'a': Writeln(FilVar, VolA:12:0);
     'b': Writeln(FilVar, VolB:12:0);
     'c': Writeln(FilVar, VolC:12:0);
  end; {End case Last of}

  goto More_Data_Ram;

Data_Transfer_Done:

  Close(FilVar);


>
```

We claim:

1. A system for collecting and processing traffic data, comprising:

a traffic detection means including a transducer for detecting passage of vehicles and providing a corresponding output signal responsive to each passing vehicle;

a portable field data recording unit including a microprocessor means programmed for receiving and processing the transducer output signals in a field location and tabulating traffic data therefrom over predetermined time intervals and memory means for storing the traffic data;

a traffic data processing computer means programmed for receiving, storing and further processing the traffic data from the field data recording unit at a location removed from the field location; and connector means for connecting the field data recording unit interchangeably to the transducer in said field location for inputting said output signals and to the data processing computer means in said removed location for communicating the stored traffic data to the computer means;

the connector means including means for connecting the microprocessor means to a power supply when the data recording unit is connected to one of the transducer and the computer means; and the data recording unit including a power storage means for maintaining power to the memory means independently of the power supply when the data recording unit is disconnected from the transducer and the computer means.

2. A system according to claim 1 in which the connector means includes a multi-pin connector end of one of a male type and a female type in the field data recording unit and a multi-pin connector end of the other one of a male type and a female type connected to each of the transducer and the computer means.

3. A system according to claim 2 in which the multi-pin connector end connected to the transducer includes first means detectable by the field data recording unit for identifying the transducer, the multi-pin connector end connected to the computer means includes second means detectable by the field data recording unit for identifying the computer means, and the microprocessor means includes means for detecting and distinguishing between the first means and the second means and selecting between a first mode of operation to receive signals from the transducer for processing and storing as traffic data and a second mode of operation to communicate stored traffic data to the computer means.

4. A system according to claim 2 in which the transducer is one of a first type of transducer having a first form of output signal and a second type of transducer having a second form of output signal, the multi-pin connector end connected to the first type of transducer including first means detectable by the field data recording unit for identifying the first type of transducer and the multi-pin connector end connected to the second type of transducer including second means detectable by the field data recording unit for identifying the second type of transducer, and the microprocessor means includes means for detecting and distinguishing between the first means and the second means and selecting between a first mode of operation to receive signals from the first type of transducer and a second mode of operation to receive signals from the second type of transducer, thereby to receive output signals interchangeably from either type of transducer for processing and storing as traffic data.

5. A system according to claim 1 in which the data recording unit includes a real time clock and an interval timing means for a user to select one of a predetermined set of timing intervals for the microprocessor means to receive, process and periodically store traffic data, the microprocessor means including means for commencing each timing interval at a time determined by the real-time clock that is a rational fraction of an hour equal to the selected timing interval.

6. A system according to claim 1 in which the data recording unit includes a real-time clock for providing a real time and an interval timing means for a user to select one of a predetermined set of timing intervals for the microprocessor means to receive, process and periodically store traffic data, the microprocessor means including means for storing traffic data for an initial interval together with a reading from the real-time clock of the real time of commencement of said interval in the memory means.

7. A system according to claim 1 in which the data recording unit includes a real-time clock and the computer means includes means for transmitting a real-time to the data recording unit via the connector means, the microprocessor means including means for setting the real-time clock to the time received from the computer means.

8. A system according to claim 7 in which the data recording unit includes an interval timing means for a user to select one of a predetermined set of timing intervals for the microprocessor means to receive, process and periodically store traffic data, and means for synchronizing the timing intervals with the real-time clock.

9. A system according to claim 1 in which the field data recording unit includes:

detection means for discerning whether the unit is connected to an inductive-loop-type transducer or a hose-type transducer; and means responsive to the detection means for controlling the microprocessor means to count one vehicle per output signal if the transducer is the inductive-loop-type and to count one vehicle per two output signals if the transducer is the hose-type transducer.

10. A system according to claim 9 in which:

the connector means includes a multi-pin connector end connected to the transducer for connecting the field data recording unit to the transducer; and the detection means includes means in the connector end for identifying the type of transducer.

11. A system according to claim 1 in which:

the transducer is one of a first type of transducer having an M-pulse-per-vehicle output signal and a second type of transducer having an N-pulse-per-vehicle output signal, where M and N are unequal non-zero integers;

the connector means includes a first connector end connected to the first type of transducer including first means detectable by the field data recording unit for identifying the first type of transducer and a second connector end connected to the second type of transducer including second means detectable by the field data recording unit for identifying the second type of transducer; and the microprocessor means includes means for detecting and distinguishing between the first means and the second means and means responsive to the detection means for dividing the number of transducer output signal pulses by one of M and N to determine a number of passing vehicles for processing and storing as traffic data.

12. A system according to claim 1 wherein the data recording unit includes a first clock means for clocking the microprocessor means and a second clock means for providing a time of day so that the stored traffic data may include the time of day.

13. A method for collecting and processing traffic data, comprising:

providing a portable field data recording unit including a microprocessor and data storage memory, and connector means for connecting the field data recording unit interchangeably to a transducer and to a data processing computer;

detecting passage of vehicles and providing a corresponding transducer output signal responsive to each passing vehicle;

receiving and processing each of the transducer output signals in a field location to tabulate traffic data therefrom over predetermined time intervals, and storing the traffic data for a plurality of said intervals in said data storage memory;

disconnecting the field data recording unit from the transducer and connecting it to the data processing computer at a location removed from the field location;

transmitting the traffic data from the field data recording unit to the computer;

storing and further processing the traffic data in the computer;

powering the microprocessor through the connector means; and providing an internal power supply in the data recording unit for maintaining power to the data storage memory independently of the connection means.

14. A method according to claim 13 including providing a multi-pin connector end connected to the transducer having first means detectable by the field data recording unit for identifying the transducer and a multi-pin connector end connected to the computer having second means detectable by the field data recording unit for identifying the computer, and detecting and distinguishing between the first means and the second means and selecting between a first mode of operation to receive signals from the transducer for processing and storing as traffic data and a second mode of operation to communicate stored traffic data to the computer.

15. A method according to claim 13 in which the transducer is one of a first type of transducer having a first form of output signal and a second type of transducer having a second form of output signal, the first type of transducer having a multi-pin connector end including first means detectable by the field data recording unit for identifying the first type of transducer and the second type of transducer having a multi-pin connector end including second means detectable by the field data recording unit for identifying the second type of transducer, including detecting and distinguishing between the first means and the second means and selecting between a first mode of operation to receive signals from the first type of transducer and a second mode of operation to receive signals from the second type of transducer, thereby to receive output signals interchangeably from either type of transducer for processing and storing as traffic data.

16. A method according to claim 13 in which each of the transducer and the computer has a multi-pin connector end, including connecting the microprocessor to an external power supply through said connector.

17. A method according to claim 13 in which the data recording unit includes a real-time clock and an interval timing means for a user to select one of a predetermined set of timing intervals for the microprocessor to receive, process and periodically store traffic data, including commencing each timing interval at a time determined by the real-time clock that is a rational fraction of an hour equal to the selected timing interval.

18. A method according to claim 13 in which the data recording unit includes a real-time clock for providing a time and date and an interval timing means for a user to select one of a predetermined set of timing intervals for the microprocessor to receive, process and periodically store traffic data, including storing traffic data for an initial interval together with a reading from the clock of the time and date of commencement of said interval in the memory.

19. A method according to claim 13 in which the data recording unit includes a real-time clock and the computer includes means for transmitting a real-time to the data recording unit, including setting the real-time clock to the time received from the computer.

20. A method according to claim 19 in which the data recording unit includes an interval timing means for a user to select one of a predetermined set of timing intervals for the microprocessor to receive, process and periodically store traffic data, including synchronizing the timing intervals with the real-time clock.

21. A method according to claim 13, the transducer being one of a first type of transducer having an M-pulse-per-vehicle output signal and a second type of transducer having an N-pulse-per-vehicle output signal, where M and N are unequal, nonzero integers, and the connector means including means in the transducer detectable by the field data recorder for identifying the transducer as one of the first type or the second type, including:

determining in the data recorder whether the transducer is one of the first type or one of the second type; and responsive to said determining, dividing the number of transducer output signal pulses by M if the transducer is of the first type and by N if the transducer is of the second type to determine a number of passing vehicles, thereby to receive output signals interchangeably from either type of transducer for processing and storing as traffic data.

22. A method according to claim 13, the data recording unit including a CPU clock and a real-time clock for providing real-time data, wherein storing the traffic data includes storing real-time data indicating the time of commencement of at least a first one of said intervals.

23. A system for collecting and processing traffic data, comprising:

a traffic detection means including a transducer for detecting passage of vehicles and providing a corresponding output signal responsive to each passing vehicle;

a portable field data recording unit including a microprocessor means programmed for receiving and processing the transducer output signals in a field location and tabulating traffic data therefrom over predetermined time intervals and memory means for storing the traffic data;

a traffic data processing computer means programmed for receiving, storing and further processing the traffic data from the field data recording unit at a location removed from the field location; and connector means for connecting the data recording unit to one of the transducer and the computer means;

the data recording unit including a CPU clock for clocking the microprocessor means and a real-time clock for providing a time of day to the microprocessor means, the CPU clock and the real-time clock operable independently of each other.

24. A system according to claim 23 in which:

the connector means includes means for connecting the microprocessor means and the CPU clock to an external power supply for powering the microprocessor means and the CPU clock when the data recording unit is connected to one of the transducer and the computer means; and the recording unit includes battery means for maintaining power to the real-time clock independently of the external power supply whereby the real-time clock continues to run while the data recording unit is disconnected from the transducer and the computer means.

25. A system according to claim 23 in which:

the connector means includes means for connecting the microprocessor means to an external power supply for powering the microprocessor means and the CPU clock when the data recording unit is connected to one of the transducer and the computer means; and the recording unit includes battery means for maintaining power to the data storage memory means independently of the external power supply whereby data stored in the memory means is preserved while the data recording unit is relocated.

26. A system according to claim 25 in which the battery means is a lithium battery.

27. A system according to claim 23 in which:

the data recording unit includes an interval timing means for a user to select one of a predetermined set of timing intervals for the microprocessor means to receive, process and periodically store traffic data; and the microprocessor means includes means for commencing each timing interval at a time determined by the real-time clock that is a rational fraction of an hour equal to the selected timing interval.

28. A system according to claim 23 in which:

the data recording unit includes an interval timing means for a user to select one of a predetermined set of timing intervals for the microprocessor means to receive, process and periodically store traffic data; and the microprocessor means includes means for storing traffic data for an initial interval together with a reading from the real-time clock of the real time of commencement of said interval in the memory means.

29. A system according to claim 23 in which:

the computer means includes means for transmitting a real time to the data recording unit via the connector means;

and the microprocessor means includes means for setting the real-time clock to the real time received from the computer means.

30. A system according to claim 23 in which the data recording unit includes an interval timing means for a user to select one of a predetermined set of timing intervals for the microprocessor means to receive, process and periodically store traffic data, and means for synchronizing the timing intervals with the real-time clock.

31. A system for collecting and processing traffic data, comprising:

a traffic detection means including a transducer for detecting passage of vehicles and providing a corresponding output signal responsive to each passing vehicle;

a portable field data recording unit including a microprocessor means programmed for receiving and processing the transducer output signals in a field location and tabulating traffic data therefrom over predetermined time intervals and memory means for storing the traffic data;

a traffic data processing computer means programmed for receiving, storing and further processing the traffic data from the field data recording unit at a location removed from the field location;

connector means for interchangeably connecting the field data recording unit to the transducer in said field location for inputting said output signals and to the data processing computer means in said removed location for communicating the stored traffic data to the computer means;

detection means for detecting whether the recording unit is connected to the transducer or to the computer means; and means in the data recording unit responsive to the detection means for selecting between a first mode of operation to receive signals from the transducer for processing and storing as traffic data if the unit is connected to the transducer and a second mode of operation to communicate stored traffic data to the computer means if the unit is connected to the computer means.

32. A system according to claim 31 in which:

the connector means includes a connector end connected to the computer means for connecting the field data recording unit to the computer means; and the detection means includes means in the connector end for indicating presence of the computer means.

* * * * *